United States Patent [19]
Drysdale et al.

[11] Patent Number: 6,058,102
[45] Date of Patent: May 2, 2000

[54] METHOD AND APPARATUS FOR PERFORMING SERVICE LEVEL ANALYSIS OF COMMUNICATIONS NETWORK PERFORMANCE METRICS

[75] Inventors: R. Scott Drysdale, Frederick; James D. Ennis, Jr., Ijamsville; John E. Hasselkus, Germantown; Thomas R. Nisbet, Ellicot City; Robert C. Troutman, Gaithersburg; Kenneth J. Rehbehn, Garret Park; David E. Wheeler, Jr., Germantown, all of Md.

[73] Assignee: Visual Networks Technologies, Inc., Rockville, Md.

[21] Appl. No.: 09/187,611

[22] Filed: Nov. 6, 1998

Related U.S. Application Data

[60] Provisional application No. 60/064,620, Nov. 7, 1997.

[51] Int. Cl.[7] .......................................................... H04J 3/14
[52] U.S. Cl. ............................................. 370/252; 370/248
[58] Field of Search ..................................... 370/241, 242, 370/243, 244, 245, 248, 249, 250, 251, 252, 253; 340/825.06, 825.17

[56] References Cited

U.S. PATENT DOCUMENTS 5,450,394 9/1995 Gruber et al. .
5,521,907 5/1996 Ennis, Jr. et al. .

*Primary Examiner*—Huy D. Vu

[57] ABSTRACT

A data transmission system includes probes connected between end user sites and a data switching network. Each probe is connected to the switching network via an access channel wherein transmission circuits establish paths between the sites through the access channel and switching network. The probes capture and retransmit data traveling between the sites over respective transmission circuits, and can thereby insert service level analysis (SLA) messages into the data traffic in order to actively communicate network performance information to other probes. For each transmission circuit, the probes periodically collect measurements related to one or more network performance metrics, including: round-trip delay (RTD), data delivery ratio (DDR) and network availability. During each SLA measurement cycle, a sequence of SLA messages is exchanged over each transmission circuit, which messages contain data used to determine RTD and DDR. Optionally, the SLA message contents and protocol are designed to allow the SLA messages to be encapsulated in a single, standard data unit of any conventional data transmission protocol, such as an ATM cell. Consequently, the messaging system can be used with any data transmission protocol and in interworked networks without modification of the message data payload. The SLA measurements collected by the probes can be transmitted to a console in communication with the probes for processing, display, and archiving.

91 Claims, 5 Drawing Sheets

| Byte 0 | Byte 1 | Byte 2 | Byte 3 |
|---|---|---|---|
| Version # | Message Type | Sequence # | |
| SlaUpTime(s) | | | |
| Last RX timestamp ($T_2$ in $M_2$, $T_4$ in $M_3$) | | | |
| Last TX timestamp ($T_1$ in $M_3$, $T_3$ in $M_4$) | | | |
| Non-burst offered PDUs ($M_3$, $M_4$) | | | |

FIG. 4

METHOD AND APPARATUS FOR PERFORMING SERVICE LEVEL ANALYSIS OF COMMUNICATIONS NETWORK PERFORMANCE METRICS

CROSS REFERENCE TO RELATED APPLICATION

This application claims priority from U.S. Provisional Patent Application Ser. No. 60/064,620, entitled "Method And Apparatus For Measurement of Network Availability, Data Delivery Ratio and Round Trip Delay In Communications Networks," filed Nov. 7, 1997. The disclosure of that provisional patent application is incorporated herein by reference in its entirety.

BACKGROUND OF THE INVENTION

1. Field of the Invention

The present invention relates to a method and apparatus for monitoring data transmission through a communications network while the communications network is in service. More particularly, the present invention relates to a network monitoring system having endpoint probes that transmit and receive message data over a packetized switching network to exchange information allowing the probes to measure network performance metrics, such as network availability, data delivery ratio and round trip delay in the communications network.

2. Description of the Related Art

Both from an end user and service provider standpoint, there is an increasing need to accurately measure operational performance of data communications networks. Communications networks, especially packetized data networks, are currently utilized in various applications for transmission and reception of data between parties at different locations. A typical data transmission system includes a plurality of end user sites and a data packet switching network, which resides between the sites to facilitate communications. Each site is connected to the switching network via an access channel (i.e., a channel connecting a site to a communications system), wherein transmission circuits, preferably virtual circuits, establish paths between the sites through the access channel and the switching network.

Packetized data networks typically format data into packets for transmission from one site to another. In particular, the data is partitioned into separate packets at a transmission site, wherein the packets usually include headers containing information relating to packet data and routing. The packets are transmitted to a destination site in accordance with any of several conventional data transmission protocols known in the art (e.g., Asynchronous Transfer Mode (ATM), Frame Relay, High Level Data Link Control (HDLC), X.25, IP tunneling, etc.), by which the transmitted data is restored from the packets received at the destination site.

Packetized data communications are especially appealing for common carrier or time-shared switching systems, since a packet transmission path or circuit is unavailable only during the time when a packet utilizes the circuit for transmission to the destination site, thereby permitting other users to utilize that same circuit when the circuit becomes available (i.e., during intervening periods between packet transmissions). The access channel and each individual transmission circuit typically have a maximum data carrying capacity or bandwidth that is shared among the various users of the network. The access channel utilization is typically measured as an aggregate of the individual circuit utilizations and has a fixed bandwidth, while the individual circuits may be utilized by several users wherein each user may utilize an allocated portion of the circuit.

Typically, when a party needs to send and receive data over distances, the party (end user) enters into a service contract with a service provider to provide access to a data communications network. Depending on an individual end user's needs, the service contract may include provisions that guarantee certain minimum performance requirements that the service provider must meet. For example, if the end user expects to send and receive a certain amount of data on a regular basis, the end user may want the service provider to guarantee that a certain minimum bandwidth will be available to the end user at all times. Certain end user applications are sensitive to transmission delays and/or the loss of data within the network (i.e., failure to successfully deliver data packet(s) to their destination). Specifically, while loss of data packets can generally be detected by end users (via information provided in the data transmission protocol), and lost packets can be retransmitted, certain applications cannot function when the percentage of lost data exceeds a given level. Thus, the end user may want the service provider to guarantee that the average or minimum ratio of data units delivered by the network to data units offered to the network at the far-end is above a certain percentage and/or that the average or maximum transmission delays will not exceed a certain duration.

From a service provider's perspective, it would be competitively advantageous to be able to demonstrate to potential and existing end users that the service provider is capable of meeting and does meet such network performance metrics. Thus, the capability to provide analysis of network system performance at the service level, i.e., service level analysis (SLA), particularly in the context of network systems that share bandwidth between sites, would be advantageous from both an end user and service provider standpoint.

Various systems have been proposed which provide some measure of network system performance. Specifically, a number of techniques for measuring round trip delay (RTD) of data transmitted between two sites is known. For example, U.S. Pat. No. 5,521,907 to Ennis, Jr. et al., the disclosure of which is incorporated herein by reference in its entirety, discloses a system for passively measuring the round trip delay of data messages sent between two sites. More specifically, a console triggers probes at two sites to store data packets being sent between the two sites. The probes generate unique packet signatures based on the data in the packets, and time stamp the signatures. By matching signatures from the two probes and comparing the corresponding timestamp values, the console can determine the round trip delay between the sites. This technique requires the storage, transmission and processing of a significant amount of data, particularly if implemented to periodically monitor all virtual circuits existing between a set of sites. That is, the passive probes cannot individually determine round trip delay, and each probe must store and transmit a substantial amount of data to the console which is required to correlate signature and timestamp data from different sites.

U.S. Pat. No. 5,450,394 to Gruber et al., the disclosure of which is incorporated herein by reference in its entirety, discloses a technique for determining round trip delay in which measurement cells containing timestamp information are sent between two nodes. A first node transmits a measurement cell with a first time stamp to a second node, and the second node replies with a measurement cell containing additional time stamp information which can be used by the first node to determine the round trip delay. Because the technique relies, in part, on timestamps already present in PM OAM (performance management operations, administration and maintenance) ATM cells, the technique is specific to the ATM protocol and cannot readily be adapted to other data protocols or be expanded to monitor other service level performance metrics. Further, the technique does not allow both nodes to measure the round trip delay of the same sequence of cells (i.e., either only one of the two nodes measures round trip delay or the two node measure delays of different transmitted cell sequences).

Further, while it is possible for individual switches in existing network systems to indicate how many packets of data have been dropped by the switch, there are no known systems capable of measuring a rate of successful (or unsuccessful) data delivery on a service level, e.g., over a particular virtual circuit or to a particular end user.

The problem of providing service level analysis of network performance is complicated by the fact that many switching networks comprise interworked systems using plural, different data transmission protocols (e.g., an ATM switching network interworked with a Frame Relay switching network), thereby forming a so-called "interworked" network. Such interworked networks are becoming more common, and present an additional challenge to designing a service level analysis tool that employs a standard message structure and messaging protocol useful for communicating between any two sites. Existing systems relying on inter-site or inter-probe messages to assess system performance are generally incapable of operating across interworked networks.

Accordingly, there remains a need for a system capable of providing service level analysis (SLA) of communications network performance, especially packetized, interworked data networks, to provide end users and service providers information relating to performance metrics, such as round trip delay, data delivery ratio, and other metrics, such as the percentage of time the network is available.

SUMMARY OF THE INVENTION

It is an object of the present invention to provide service level analysis of network performance metrics of interest to data communications network end users and service providers.

It is a further object of the present invention to assess whether communications network transmission delays remain within acceptable limits.

It is yet a further object of the present invention to monitor the round trip delay of data transmitted over a transmission circuit (e.g., a virtual circuit (VC) or a permanent virtual circuit (PVC)) connecting endpoint sites.

It is a still further object of the present invention to assess whether a data communications network delivers to a destination, an acceptable percentage of data units offered to the network that are bound for the destination, particularly in a shared bandwidth environment.

It is another object of the present invention to monitor a rate of successful (or unsuccessful) data delivery of data transmitted over a transmission circuit connecting endpoint sites.

It is yet another object of the present invention to actively monitor network performance metrics, such as round trip delay and data delivery ratio, by transmitting over a transmission circuit connecting endpoint sites, messages containing data transmission monitoring information.

It is still another object of the present invention to provide service level analysis of network performance metrics in an interworked network environment.

A further object of the present invention is to provide a tool capable of performing service level analysis with any conventional data transmission protocol.

Yet a further object of the present invention is to transmit service level analysis (SLA) messages over transmission circuits connecting user endpoints that can be encapsulated in a single, standard data unit of any conventional data transmission protocol.

Still a further object of the present invention is to provide service level analysis of network performance metrics by transmitting SLA messages over circuits connecting endpoint sites without requiring synchronization between local site/probe clocks.

Another object of the present invention is to monitor network availability of transmission circuits connecting endpoint sites.

The aforesaid objects are achieved individually and in combination, and it is not intended that the present invention be construed as requiring two or more of the objects to be combined unless expressly required by the claims attached hereto.

The system of the present invention provides a service level analysis (SLA) capability for communications networks, especially any packetized, circuit-oriented data networks, wherein packets (or units) of data are transmitted to a destination site in accordance with one or a combination of data transmission protocols, including, but not limited to: Frame Relay; ATM and X.25. According to the present invention, a data transmission system includes endpoint probes connected between corresponding endpoint user sites and a data switching network. Each probe is connected to the switching network via an access channel wherein transmission circuits, preferably virtual circuits (e.g., a permanent virtual circuit (PVC), a switched virtual circuit (SVC) or a tunnel through an IP network), establish paths between the sites/probes through the access channel and switching network. A virtual circuit is basically a path established in a packet switching network to transfer data to a specific destination or site.

Each probe captures and retransmits data traveling between its site and other sites over respective transmission circuits (such as virtual circuits (VCs)) of the switching network, and can thereby insert service level analysis (SLA) messages into the data traffic in order to actively generate and communicate network performance information to other probes.

Each probe periodically stores data collected for each VC associated with the site, which data is used to monitor certain network performance metrics on a per-VC basis. Specifically, each probe performs service level analysis, including monitoring of one or more of the following system performance metrics: round-trip delay, data delivery ratio and availability. These performance metrics are measured for each virtual circuit connecting endpoint sites through the network, although these metrics are affected by the access line and access channel.

During each SLA measurement cycle, whose duration can be set at a desired predetermined value, such as every fifteen minutes, a probe exchanges a sequence of SLA messages over each VC connecting the probe to other probes. The sequence of messages contains timestamp and counter data that allows the probe to determine the round trip delay of the SLA messages as well as the number of data units offered to the network (bound for the probe's site) and the number of data units actually delivered to the site for each VC connected to the site. The probes are not required to be time synchronized in order to exchange these SLA messages.

In accordance with another aspect of the present invention, the SLA message contents and protocol are designed to allow the SLA messages to be encapsulated in a single, standard data unit of any conventional data transmission protocol, e.g., an ATM cell or a Frame Relay frame. Consequently, the messaging system can be used with any data transmission protocol and in interworked networks without modification of the message data payload.

The SLA measurements collected by the probes can be transmitted to a console in communication with the probes for processing, display, and archiving. The SLA measurements provided by the probes of the present invention allows end users and service providers to know whether the network performance is meeting requirements set forth in a customer service agreement.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 4 is a diagram illustrating an inter-probe message structure used in accordance with an exemplary embodiment of the present invention to transmit measurements supporting service level analysis of network performance metrics.

DETAILED DESCRIPTION OF THE PREFERRED EMBODIMENTS

Figure 1:
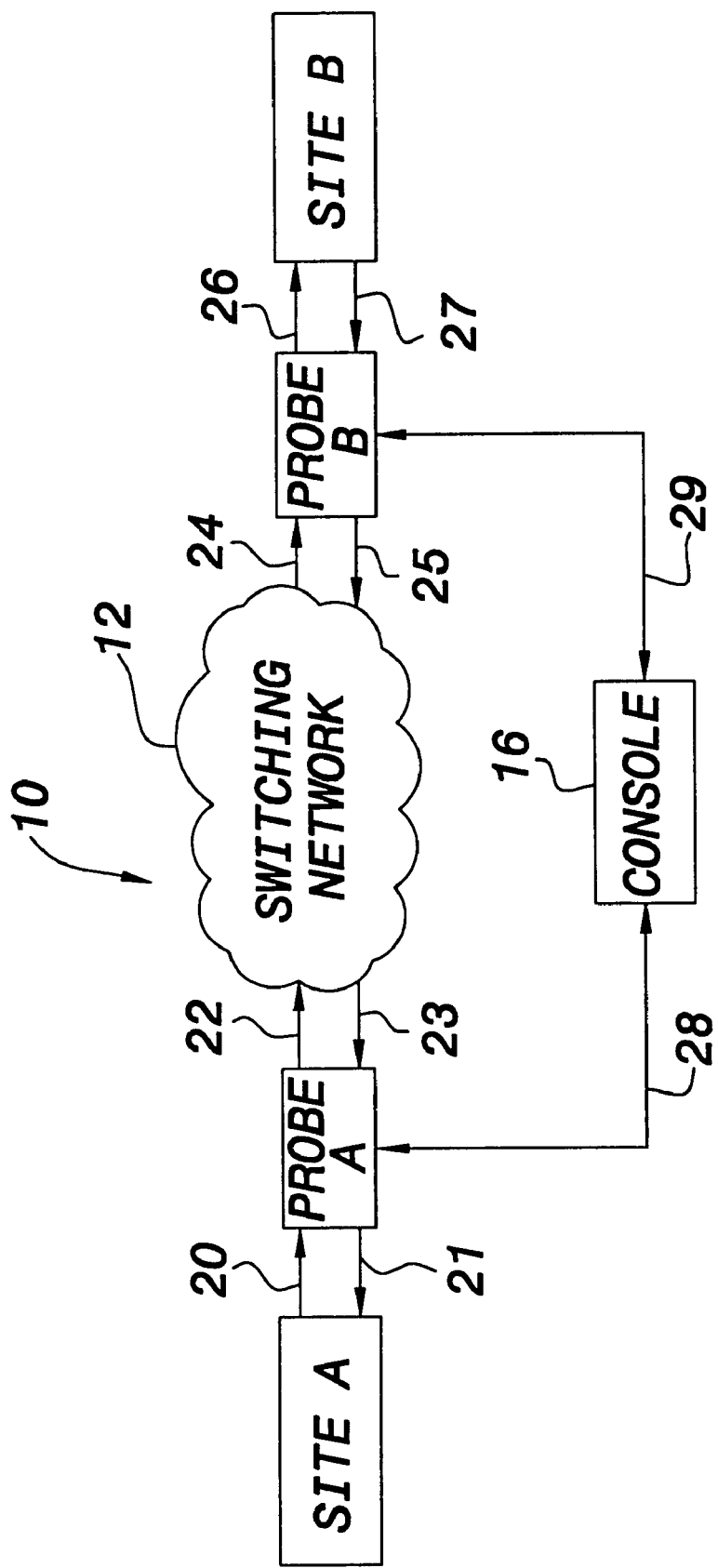
FIG. 1 is a functional block diagram of a data transmission system having service level analysis probes disposed between endpoint sites and a switching network in accordance with an exemplary embodiment of the present invention.

A system for monitoring performance and providing service level analysis (SLA) capability for data communications networks is illustrated in FIG. 1. Specifically, an exemplary data transmission system 10 includes two sites (A and B) and a packet switching network 12 to facilitate communications between the sites. Site A is connected to network 12 via a probe A, while site B is connected to network 12 via another probe B. Site A is connected to probe A by communication lines 20 and 21, probe A is connected to network 12 by communication lines 22 and 23, network 12 is connected to probe B by communication lines 24 and 25, and probe B is connected to site B by communication lines 26 and 27. The data transmission system 10 typically includes conventional telecommunications line types, such as T3, OC-3, North American T1 (1.544 Mbits/second), CCITT (variable rate), 56K or 64K North American Digital Dataphone Service (DDS), and a variety of data communications connections, such as V.35, RS-449, EIA 530, X.21 and RS-232. Sites A and B are each capable of transmitting and receiving data packets in various protocols utilized by communication lines 20, 21, 26 and 27, such as Asynchronous Transfer Mode (ATM), Frame Relay, High Level Data Link Control (HDLC) and X.25. Each line 20–27 represents a respective transmission direction as indicated by the arrows. For example, the arrows on communication lines 20 and 27 represent transmissions from sites A and B to probes A and B, respectively, while the arrows on communication lines 21 and 26 represent transmissions to sites A and B from probes A and B, respectively. Similarly, the arrows on communication lines 22 and 25 represent transmissions from probes A and B to switching network 12, respectively, while the arrows on communication lines 23 and 24 represent transmissions to probes A and B from switching network 12, respectively.

Generally, site A and site B utilize switching network 12 to communicate with each other, wherein each site is connected to switching network 12 via an access channel having transmission circuits, preferably virtual circuits, that establish paths between the sites through the access channel and switching network. The access channel refers to the lines utilized by each site to communicate with the switching network (i.e., communication lines 20–27), while a virtual circuit is basically a path established through a packetized data switching network that transfers data to a specific endpoint or site.

As used herein, the term "packet" (e.g., as used in "packetized switching network") does not imply any particular transmission protocol and can refer to units or segments of data in a system using, for example, any one or combination of the above-listed data transmission protocols (or other protocols). However, since the term "packet" is often associated with only certain data transmission protocols, to avoid any suggestion that the system of the present invention is limited to any particular data transmission protocols, the term "protocol data unit" (PDU) will be used herein to refer the unit of data being transmitted from sites A and B through switching network 12. Thus, for example, a PDU can be carried on a frame in the Frame Relay protocol, a related set of cells in the ATM protocol, or a packet in the IP protocol.

As shown in FIG. 1, probes A and B are respectively disposed between switching network 12 and sites A and B. Probes A and B can be located at sites A and B or at any point between switching network 12 and sites A and B. Probes A and B allow PDUs being sent between sites A and B via switching network 12 to pass through the probe and also insert inter-probe message PDUs into the data traffic. As used herein, the term "to the switching network" refers to the direction of data traveling to the switching network (e.g., data traveling on communication lines 20, 22, 25 and 27), while the term "from the switching network" refers to the direction of data traveling from the switching network (e.g., data traveling on communication lines 21, 23, 24 and 26). The terms "arriving", "to switching network", "departing", and "from switching network" are all relative and are employed to imply transmission direction.

For illustrative purposes, only two sites (A and B) are shown in FIG. 1. However, it will be understood that the data communication system can include numerous sites, wherein each site is generally connected to multiple other sites over corresponding transmission circuits, such as virtual circuits (VCs).

In accordance with an exemplary embodiment of the present invention, probes A and B actively perform service level analysis (SLA) by exchanging a sequence of inter-probe SLA messages that are inserted into the data traffic traveling over switching network 12 between sites, and that contain information allowing the probes to monitor one or more of the following system performance metrics on a per-virtual-circuit basis for each virtual circuit connecting each site to other sites: round trip delay, data delivery ratio and network availability. Round-trip delay (RTD) can be defined as the duration of time required for a PDU to go from a first end of a virtual circuit (VC) to the second end plus the time required for return PDU to go from the second end of the VC to the first end. This round trip delay does not include the far-end turn around time (i.e., the duration between the receive time of the first PDU at the second end and the transmit time of the return PDU from the second end). Optionally, components of the delay that are not attributable to the switching network, such as those related to the access line rate (i.e. serialization delays), can be excluded from the computed RTD. Data Delivery Ratio (DDR) is the ratio of the number of PDUs delivered on a transmission circuit by the network, to the number of PDUs offered to the network on that transmission circuit. The DDR can be computed from the aggregate of the PDUs offered and delivered in both directions of the circuit or as separate, one-way ratios, as described in greater detail below. Availability is defined as the percent of the time that the network (or virtual circuit) is capable of accepting and delivering user PDUs within the total time of a measurement period. Unlike RTD and DDR, Availability can be determined passively, without inserting messages into the data traffic, as explained below.

The SLA measurements performed by the probes to monitor these network performance metrics apply specifically to the virtual circuits through the switching network, although they are affected by the access line and access channel. The measurements that are accumulated on the probes of the present invention support service level analysis. Each measurement is preferably accumulated on a continuous basis with a minimum of one historical sample per fixed historical time interval, e.g., once every fifteen minutes. As will become evident, the measurements are collected in a manner that scales to very large networks without performance degradation.

In order to acquire the service level analysis (SLA) measurements required to determine round trip delay (RTD) and data delivery ratio (DDR), endpoint probes A and B insert data into the user data stream being transmitted through the network over the managed transmission circuit connecting sites A and B, which circuit can be a virtual circuit (VC). Probes A and B also insert similar data over the other VCs connecting sites A and B to other sites.

More specifically, each site's probe separately maintains a periodic historical measurement cycle (which can be, for example, 15 minutes long) which is not required to be synchronized with the periodic measurement cycles of other probes. During each periodic cycle, each probe acquires one set of SLA measurements for each VC. At an activation time within the cycle (which is an arbitrary, predetermined time after the beginning of the measurement cycle, e.g., the mid-point of each measurement cycle), each probe initiates an inter-probe message sequence on each VC that has not already had an inter-probe message sequence initiated by a far-end probe. That is, because the periodic cycles of the endpoint probes in the communications system are not synchronized, when the activation time within a cycle occurs for a particular probe (probe A), certain far-end probes connected to probe A over certain VCs may have already reached the activation times within their measurement cycles, and therefore would have initiated a message sequence for these VCs. Other far-end probes connected to probe A over other VCs may not have reached the activation times within their cycles at the activation time of probe A's cycle, and therefore would not have initiated a message sequence for these other VCs. For illustrative purposes, it is assumed in the exemplary embodiment that probe A reaches the activation time within its periodic measurement cycle prior to probe B reaching the activation time within its periodic measurement cycle, and therefore probe A initiates the inter-probe messaging sequence with probe B over the VC connecting probes A and B. However, it will be understood that the hereafter-described message sequence is initiated for every VC by the one of the VC's two endpoint probes that first reaches the activation time within its periodic historical measurement cycle.

Each probe acquires certain information for each VC during each measurement cycle in order to support SLA. Specifically, in order for each probe to be able to determine the round trip delay (RTD) for a VC, the probe must know the transmit and receive times of an SLA message PDU transmitted in one direction over the VC and the transmit and receive times of a reply SLA message PDU transmitted in the opposite direction over the VC.

In order to determine the data delivery ratio (DDR), for each monitored VC, each probe maintains a counter that accumulates the count of the total number of PDUs delivered ("delivered PDUs") by the network over the VC (e.g., probe A maintains a count of the number of PDUs delivered by the network from probe B and vise versa). Additionally, each probe maintains a counter, per VC, that accumulates the total number of PDUs offered by the probe.

To support SLA, probe A acquires and stores in each measurement cycle a count of the PDUs bound for site A that were offered to the network by probe B (not initially known by probe A, but known by probe B), and a count of the PDUs originating from site B that were delivered by the network to probe A (known by probe A from its counters). Similarly, probe B acquires and stores in each measurement cycle a count of the PDUs bound for site B that were offered to the network by probe A (not initially known by probe B, but known by probe A), and a count of the PDUs originating from site A that were delivered by the network to probe B (known by probe B from its counters). Probes A and B acquire these measurements for all other VCs as well.

Figure 2:
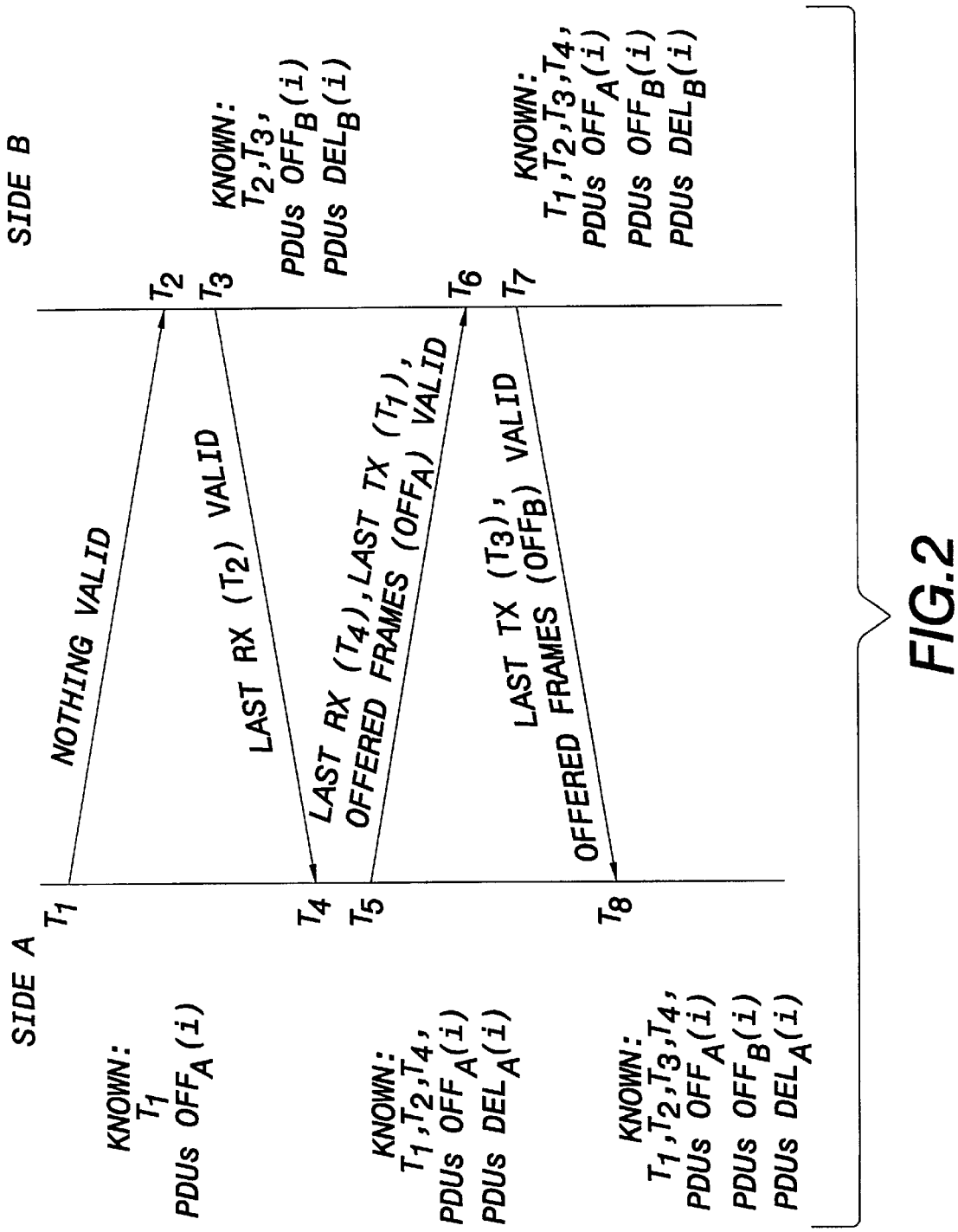
FIG. 2 is a diagram illustrating the time sequence and contents of a sequence of inter-probe messages sent between two probes of the present invention.
Figure 3A:
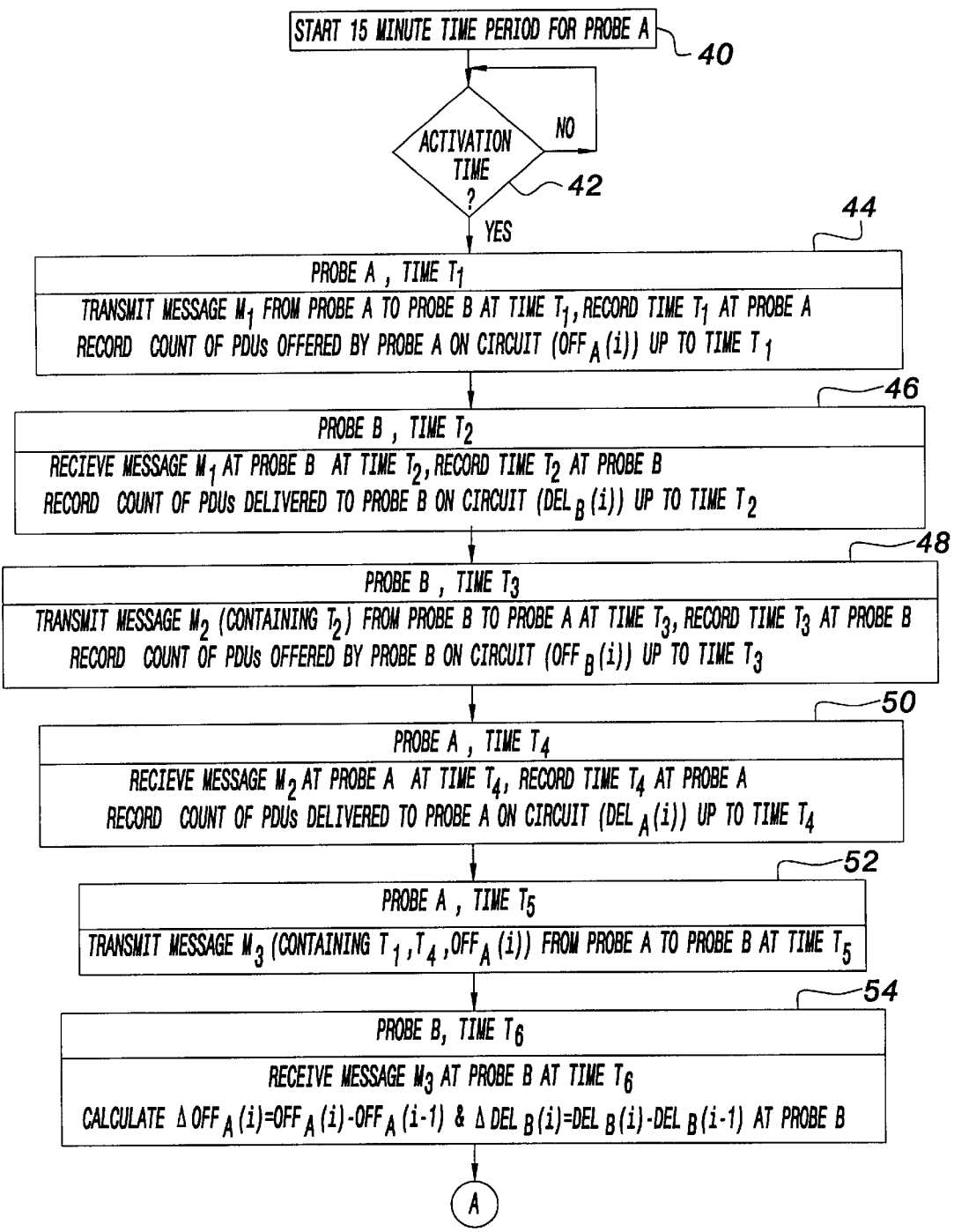
FIGS. 3A and 3B illustrate a functional flow chart corresponding to the diagram of FIG. 2, indicating operations performed by the probes of the present invention in order to capture and store measurements supporting service level analysis of network performance metrics.

Referring to FIGS. 2 and 3, acquisition of the aforementioned SLA measurements by endpoint probes A and B is described. When probe A reaches the activation time of a periodic measurement cycle, probe A sends an "initial request" message $M_1$ to probe B (see FIG. 2, FIG. 3A, blocks 40–44). The actual transmit time $T_1$ of message $M_1$ is not known by probe A until the message $M_1$ is sent; accordingly, message $M_1$ does not contain timestamp information indicating the time of its transmission.

Once the transmit time $T_1$ of message $M_1$ is known, probe A records a count ($OFF_A(i)$) of the PDUs (bound for probe B) that probe A has offered to the network up to time $T_1$. The index i denotes the present periodic measurement cycle. The PDU count $OFF_A(i)$ can be a "delta" count, meaning that the count is the number of PDUs offered to the network from the time the last initial request message was sent (at the activation time within the previous (i–1) periodic historical measurement cycle) up to time $T_1$. However, for reasons that will become evident, the PDU count $OFF_A(i)$ and the other PDU counts recorded by the probes are preferably "raw" counts, meaning that the counts are running totals counted from the time of system boot up or the last counter roll-over. The use of raw counts requires the probes to maintain a record of the raw counts recorded during the message sequence in the previous measurement cycle (i−1) in order to compute the delta PDU counts that pertain to the present data collection interval (which runs from the present activation time to the previous activation time).

As explained above, the count (OFF$_A$(i)) is needed by probe B to support SLA; however, since OFF$_A$(i) is not known until after the transmission time T$_1$ of message M$_1$ is known, OFF$_A$(i) (like T$_1$) cannot be sent to probe B in message M$_1$. Time T$_1$ is measured relative to a local clock of probe A, which clock need not be synchronized with a corresponding local clock of probe B.

As shown in FIG. 2, message M$_1$ travels over the network VC and is received by probe B at time T$_2$ (as measured relative to a local clock of probe B). In response to reception of message M$_1$, probe B records a count (DEL$_B$(i)) of the PDUs sent by probe A that have been delivered by the network to probe B up to time T$_2$ (see FIG. 3A, block 46). Notably, because this PDU count DEL$_B$(i) and the PDU count OFF$_A$(i) measured by probe A are defined by the transmit and receive times of the same message (M$_1$), these counts relate to correlated time periods at probes A and B; thus, these counts can be directly compared (once converted to delta counts) to obtain a meaningful measure of one-way (A to B) data delivery ratio over the VC during a given data collection period.

In response to reception of initial request message M$_1$, probe B sends a "reply$_B$" message M$_2$ to probe A (see FIG. 2, FIG. 3A, blocks 48) at time T$_3$. The actual transmit time T$_3$ of message M$_2$ is not known by probe B until the message M$_2$ is sent; accordingly, message M$_2$ does not contain timestamp information indicating the time of its transmission. However, because the receive time T$_2$ of initial request message M$_1$ is known by probe B, a timestamp indicating the value of time T$_2$ is sent by probe B to probe A in reply$_B$ message M$_2$.

Once the transmit time T$_3$ of message M$_2$ is known, probe B records a count (OFF$_B$(i)) of the PDUs (bound for probe A) that probe B has offered to the network up to time T$_3$ (see FIG. 3A, block 48). As explained above, this count (OFF$_B$(i)) is needed by probe A to support SLA; however, since OFF$_B$(i) is not known until after the transmission time T$_3$ of message M$_2$ is known, OFF$_B$(i) (like T$_3$) cannot be sent to probe A in message M$_2$. Like time T$_2$, time T$_3$ is measured relative to the local clock of probe B.

As shown in FIG. 2, message M$_2$ travels over the network VC and is received by probe A at time T$_4$ (as measured relative to probe A's local clock). In response reception of message M$_2$, probe A records a PDU count (DEL$_A$(i)) of the PDUs sent by probe B that have been delivered by the network to probe A up to time T$_4$ (see FIG. 3A, block 50). Because this PDU count DEL$_A$(i) and the PDU count OFF$_B$(i) measured by probe B are defined by the transmit and receive times of the same message (M$_2$), they relate to correlated time periods at probes A and B; thus, these counts can be directly compared (once converted to delta counts) to obtain a meaningful measure of one-way (B to A) data delivery ratio over the VC over a given data collection period.

As shown in FIG. 2, as this point in time (after T$_4$), probe A knows the values of times T$_1$, T$_2$, T$_4$, and PDU counts OFF$_A$(i) and DEL$_A$(i). To provide probe B with the aforementioned information necessary to support SLA, in response to reception of reply$_B$ message M$_2$, probe A sends a "reply$_A$" message M$_3$ to probe B (see FIG. 2, FIG. 3A, block 52) at time T$_5$ containing timestamps indicating the values of times T$_1$ and T$_4$ as well as the value of count OFF$_A$(i). Reply$_A$ message M$_3$ travels over the network VC and is received by probe B at time T$_6$ (FIG. 3A, block 54). At this point, probe B has acquired all of the measurements required to support SLA, i.e., the timestamps indicating the values of times T$_1$ through T$_4$ and PDU counts OFF$_A$(i) and DEL$_B$(i). Accordingly, probe B can compute the round trip delay (RTD) as the difference between the overall round trip time (T$_4$−T$_1$) less the far-end turn around time (T$_3$−T$_2$):

$$\text{RTD}=(T_4-T_1)-(T_3-T_2)=(T_4-T_3)+(T_2-T_1) \quad (1)$$

Note that this RTD calculation is valid despite the fact that probe A's reference clock is not synchronized with probe B's reference clock due to the subtraction of T$_1$ from T$_4$ and T$_2$ from T$_3$.

Further probe B can compute, from the raw PDU counts, the delta PDU counts for the present measurement cycle i (i.e., the counts of the PDUs accumulated in the collection data period ending at the time of the message exchange) as:

$$\Delta\text{OFF}_A(i)=\text{OFF}_A(i)-\text{OFF}_A(i-1); \Delta\text{DEL}_B(i)=\text{DEL}_B(i)-\text{DEL}_B(i-1) \quad (2)$$

where OFF$_A$(i−1) is the recorded (raw) count (sent to probe B in the last measurement cycle) of the number of PDUs bound for probe B that were offered by probe A to the network up to the transmit time of the initial request message M$_1$ sent by probe A in the previous measurement cycle (i−1), and DEL$_B$(i−1) is the recorded (raw) count of the number of PDUs sent by probe A that were delivered by the network to probe B up to the receive time of the initial request message M$_1$ received by probe B in the previous measurement cycle (i−1).

As previously mentioned, PDU counts ΔOFF$_A$(i) and ΔDEL$_B$(i) can be directly compared to obtain a measure of the one-way VC data delivery ratio. For example, the one-way DDR can be computed as:

$$\text{DDR}_{A\text{-}to\text{-}B}=\Delta\text{DEL}_B(i)/\Delta\text{OFF}_A(i) \quad (3)$$

Figure 3B:
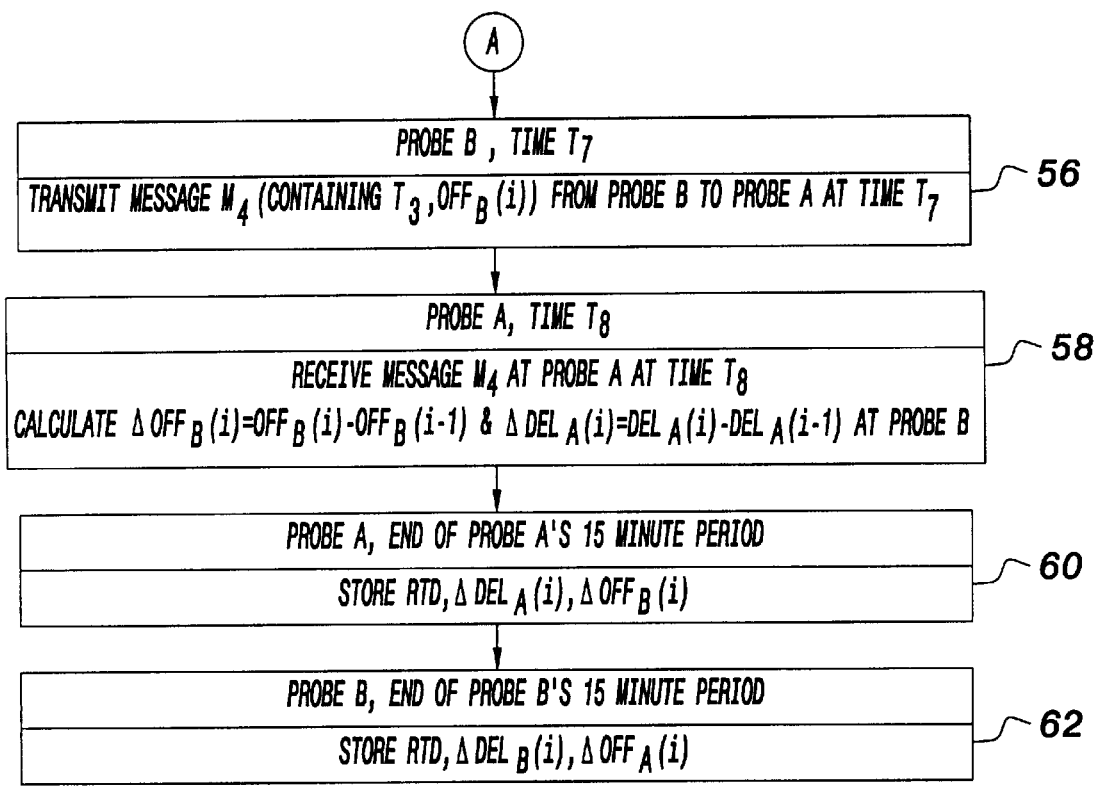

The data delivery ratio can also be computed as a two-way performance metric. In this case, probe B simply stores counts ΔOFF$_A$(i) and ΔDEL$_B$(i) for later processing by a console 16 (FIG. 1), which also receives counts ΔOFF$_B$(i) and ΔDEL$_A$(i) from probe A. Accordingly, at the end of each of probe B's periodic historical measurement cycle, the computed RTD and PDU delta counts ΔOFF$_A$(i) and ΔDEL$_B$(i) (and/or the one-way DDR) are stored by probe B for later transmission to console 16 (FIG. 3B, block 62).

To provide probe A with the aforementioned information necessary to support SLA, in response to reception of the reply$_A$ message M$_3$, probe B sends a "final reply" message M$_4$ to probe B (see FIG. 2, FIG. 3B, block 56) at time T$_7$ containing a timestamp indicating the value of time T$_3$ as well as the value of PDU count OFF$_B$(i). Final reply message M$_4$ travels over the network VC and is received by probe A at time T$_8$ (FIG. 3B, block 58). At this point, probe A has acquired all of the measurements required to support SLA, i.e., the timestamps indicating the values of times T$_1$ through T$_4$ and PDU counts OFF$_B$(i) and DEL$_A$(i). Accordingly, probe A can compute the round trip delay (RTD) using equation (1). Note that probes A and B both measure the round trip delay of the same set of messages, i.e., messages M$_1$ and M$_2$.

Further probe A can compute the delta PDU counts for the present measurement cycle i as:

$$\Delta\text{OFF}_B(i)=\text{OFF}_B(i)-\text{OFF}_B(i-1); \Delta\text{DEL}_A(i)=\text{DEL}_A(i)-\text{DEL}_A(i-1) \quad (4)$$

where $\text{OFF}_B(i-1)$ is the recorded (raw) count (sent to probe A in the last measurement cycle) of the number of PDUs bound for probe A that were offered by probe B to the network up to the transmit time of the reply$_B$ message $M_2$ sent by probe B in the previous measurement cycle (i−1), and $\text{DEL}_A(i-1)$ is the recorded (raw) count of the number of PDUs sent by probe B that were delivered by the network to probe A up to the receive time of the reply$_B$ message $M_2$ received by probe A in the previous measurement cycle (i−1).

PDU counts $\Delta\text{OFF}_B(i)$ and $\Delta\text{DEL}_A(i)$ can be directly compared to obtain a measure of the one-way VC data delivery ratio. For example, the one-way DDR can be computed as:

$$\text{DDR}_{B\text{-}to\text{-}A}=\Delta\text{DEL}_A(i)/\Delta\text{OFF}_B(i) \quad (5)$$

Again, the data delivery ratio can also be computed as a two-way performance metric. In this case, probe A simply stores counts $\Delta\text{OFF}_B(i)$ and $\Delta\text{DEL}_A(i)$ for later processing by a console, which also receives counts $\Delta\text{OFF}_A(i)$ and $\Delta\text{DEL}_B(i)$ from probe B. At the end of each of probe A's periodic historical measurement cycles, the computed RTD and PDU counts $\Delta\text{OFF}_B(i)$ and $\Delta\text{DEL}_A(i)$ (and/or the one-way DDR) are stored by probe A for later transmission to console 16 (FIG. 3B, block 60).

One advantage of transmitting raw PDU counts rather than delta PDU counts in the SLA message is that the loss of an SLA message PDU does not result in the loss of PDU count data. If a probe does not receive PDU count information within a measurement cycle due to a lost message PDU (message $M_3$ or $M_4$), the probe can simply wait until the next measurement cycle and compute the delta PDU counts for two consecutive data collection time intervals rather than the normal single data collection time interval.

Another advantage of maintaining raw PDU counts rather than delta PDU counts is that message contention situations are more easily managed. Specifically, it is possible that two probes initiate message sequences with each other substantially simultaneously (e.g., probe A transmits an initial request message $M_1$ and probe B subsequently transmits an initial request message $M_1$ prior to reception of probe A's message). Under these circumstances, when raw counts are used, the delta counts can be computed simply by subtracting the last-received PDU count values from the raw counts from the previous measurement cycle.

As an enhancement to the data delivery ratio measurement described above, the data delivery ratio can be determined for plural throughput ranges for certain data transmission protocols. For example, additional counters can be used to separately accumulate counts of PDUs where the throughput is below a committed data rate, and PDUs where the throughput is between the committed and burst date rate. This allows reports of DDR for each throughput range. The committed or peak rate of data flow can be specified differently for different transmission protocols. For example, for ATM, the peak rate of data flow is the Peak Cell Rate (PCR), and for Frame Relay the peak rate of data flow is, Bc+Be (where Bc is the number of bits the service provider is committed to deliver during a time interval, and Be is the number of bits in excess of Bc that the service provider might deliver during the time interval). Thus, for example, for the Frame Relay protocol, the count of non-burst offered frames (PDUs) can be expanded to add other two other counters: frames in seconds where the throughput is below Bc; and frames in seconds where the throughput is between Bc and Bc+Be.

Optionally, to minimize network impact, inter-probe messaging can be enabled/disabled on a per-VC basis. This allows the user to disable the message generation on VCs that do not have probes on each end.

In addition to measuring round trip delay (RTD) and data delivery ratio (DDR), the probes of the present invention can also calculate network availability. Unlike RTD and DDR, Availability is measured passively, i.e., without the assistance of SLA messages injected into the data traffic. Instead determination of Availability relies on analyzing information provided by the network operating under a particular protocol.

When the probe is operating under the Frame Relay data transmission protocol, the availability of a circuit can determined from the local management interface LMI activity between the endpoint user equipment and the network switches.

A circuit is deemed to be capable of accepting and delivering user frames whenever one of the following conditions is present on both of its ends: a local management interface (LMI) STATUS message is generated by the network in response to each STATUS ENQUIRY message, and the LMI STATUS message indicates that the circuit is valid and active; or No LMI STATUS ENQUIRY message has ever been seen by the probe (in other words, no LMI is in use on the link).

More specifically, at any one time, a circuit end-point can be in any one of the following states:
1. Link Down—user side (LMI requests are not being generated)
2. Link Down—network side (no LMI response to user generated requests)
3. Link Up, Data Link Connection Identifier (DLCI) invalid
4. Link Up, DLCI inactive
5. Link Up, DLCI active From the service provider's standpoint, the circuit is considered available if both ends of the VC are in state 1 or 5. To facilitate this determination, the probe maintains a counter for each circuit, that accumulates a count of the number of seconds that that end of the circuit was ever not in either of these states. If a probe is assuming the role of the user's equipment when the user's equipment fails to participate, state 1 cannot occur because the probe itself guarantees that LMI requests are generated. Note that, because there is no required time synchronization between probes, the console cannot accurately "line up" periodic historical samples from both ends of the VC, so the console generally must pick one end of each circuit on which to base the availability (e.g., probe A in FIG. 1). Alternatively, the console can query the probes at both ends of a circuit and use the weighted average of the two available times.

In the case of many Frame Relay switching networks, circuit status is transferred through the network so that, if the far-end site is in state 1, the near-end DLCI is marked inactive. If looking only at the near-end DLCI's statistics, the SLA report will show that the VC was down even though it was caused by far-end user equipment failure. If the probes act in the role of the user equipment, when it fails to LMI poll, this can be avoided.

In the case of ATM networks, availability cannot be derived from LMI messages. In some cases, LMI does not exist on an ATM network. OAM cell flows and cell delineation are the two factors that can be used to determine if a VC is active or not, and therefore available.

The first factor in availability is cell delineation. If the network is out of cell delineation, all VCs on that network are unavailable. The second factor in deciding availability is AIS or RDI cell flow. These OAM cells are sent into the access line on a VC to inform the network that service on that VC is not available. Any second where an AIS or RDI cell is received is considered an unavailable second.

Availability is measured on a per-circuit basis and stored in the probe as a count of the number of seconds in which the circuit was not available for any part of that second.

From time to time (e.g., a time period equal to or greater than periodic measurement cycle, up to several days), probes A and B download the aforementioned historical data samples taken at periodic intervals to a console (FIG. 1). For example, the probes collect the SLA parameters in the standard periodic measurement intervals with a two day history. Data can be periodically collected and stored in a database in accordance with a data collection process running on a database server.

The format and content of the measurements provided to the console for each periodic measurement interval is shown in Table 1.

TABLE 1

| Object Name | Type | Description |
| --- | --- | --- |
| Round-trip delay | 16-bit Integer | A sample of the number of milliseconds of round-trip delay on this circuit. This is the RTD the inter-probe messages experienced during the history interval. If this value is −1, the measurement is not available. |
| Unavailable seconds | 16-bit Counter | Number of seconds this circuit was not available during the history interval. |
| Far-end offered PDUs | 32-bit Counter | Number of non-burst PDUs offered on the far-end of this circuit since the last successful SLA conversation. If this statistic is not available for the interval, its value is 0. |
| Delivered PDUs | 32-bit Counter | Number of PDUs received during the SLA measurement interval. If the Far-end offered PDUs statistic is not available for this interval, this value is also 0. |

Referring to FIG. 1, console 16 is in communication with probe A via a communication line 28 (e.g., a local area network (LAN)) and with probe B via a communication line 29, and retrieves the information collected by probes A and B to process the information for display and/or recordation. While shown for illustrative purposes as separate communication lines, it will be understood that the communication lines connecting probes A and B can be virtual circuits over the switching network or any other suitable interconnection, and the present invention is not limited to any particular mechanization for interconnecting the probes and console. Console 16 is typically implemented by a conventional personal computer; however, other forms of computers, such as a Sun, Hewlett Packard, or IBM Unix workstation, may also be equipped and utilized as the console in substantially the same manner described below. Specifically, console 16 may be implemented by an IBM-compatible personal computer preferably equipped with a mouse, monitor, keyboard and base. The base commonly contains the processors, memory and communications resources, such as internal/external modems or other communications cards for the console. The console includes software for analyzing the data collected by the corresponding probe or probes and displaying the information to an operator, for example, in a manner similar to that described in U.S. patent application Ser. No. 08/746,416, the disclosure of which is incorporated herein by reference in its entirety.

Further, console 16 can utilize short term and long term databases to maintain data for extended periods of time. The databases may be implemented by any conventional or commercially available database. Console 16 may operate as a stand-alone console coupled to the probes, or in a client/server configuration wherein a server (i.e., a computer system as described above preferably utilizing a windows NT environment) performs substantial interactions with the probe and conveys probe information to its clients (i.e., computer systems as described above preferably utilizing a Windows 95 NT or Unix environment). Users may also communicate with the probe directly for the data collection requests and for providing configuration parameters to the probe.

While console 16 shown in FIG. 1 as a single console, it will be understood that the present invention is not limited to a single-console embodiment, and more than one console can be used to process and display monitoring information. For example, two or more consoles at different sites or locations can be used to receive data from one or more probes. In such a plural-console arrangement, the consoles would preferably be interconnected (e.g., via the network or by other communication lines) so that each console can display or record all of the monitoring information of relevance to a related site or set of sites. Accordingly, the term "console," as used herein, can be a single unit or plural, interconnected units located at one or more sites or locations, wherein the unit(s) process, display, record and/or archive system performance data in any format, such as those disclosed in U.S. patent application Ser. No. 08/746, 4160.

Console 16 receives the delta PDU counts from both probes A and B, thereby allowing console 16 to compute the two-way data delivery ratio for the VC connecting sites A and B. Specifically, DDR is calculated from the aggregate of the counts from both probes by:

$$DDR = (\Delta DEL_A + \Delta DEL_B)/(\Delta OFF_A + \Delta OFF_B) \qquad (6)$$

Again, note that calculation of DDR by this method works even if inter-probe message PDUs are lost, because the inter-probe messages carry raw counts, and the delta PDU counts are computed by the probes themselves. The round trip delay (RTD) and DDR performance metrics can then be manipulated, recorded and displayed by the console 16 in any suitable manner to depict the SLA performance at particular times or over a period of time.

Note that, for a single transmission circuit, both of the probes at the respective ends of that circuit will generally provide the RTD measurement (i.e., two identical measurements). This redundancy allows the console to receive a valid RTD even when one of the two probes fails to receive the necessary timestamp information to calculate the RTD in a measurement cycle (e.g., when the final message PDU is lost).

By way of non-limiting example, the SLA data can be presented in single tabular report as represented in the example below. Numerous other reports can be prepared from the accumulated data.

| Service Level Verification Report<br>Network: Acme Janitorial Supply<br>Period: 7/1/97–7/31/97 | | | |
|---|---|---|---|
| Circuit Designation | Availability | Delay | DDR |
| NY-to-Boston 718 | 100.000% | 78 ms | 99.980% |
| NY-to-Detroit 719 | 99.943% | 105 ms | 98.990% |
| NY-to-Charlotte 722 | 96.370% | 113 ms | 99.567% |
| NY-to-Atlanta 725 | 97.065% | 145 ms | 99.101% |
| NY-to-Los Angeles 731 | 98.950% | 138 ms | 98.781% |
| Overall Average | 98.850% | 114 ms | 99.210% |

Where the service offering describes several classes of service, each having their own service level, reports can be by service class. This can be implemented by creating each service class as a separate network. For example, all of the circuits with the SNA class of service can be configured to be in the "SNA" network. Preferably, the database stores a service class parameter for each circuit. This can be used to create reports by service class.

Optionally, the user can configure a single, weekly maintenance window of time that is automatically excluded from the SLA measurements. The window is specified by the day of the week, its start time and its duration. To automatically exclude periods of unavailability due to maintenance activity that occurs outside of a regularly scheduled maintenance window, custom integration to a trouble-ticketing system is required. Alternatively, a special type of data editor can be used to manually control exclusion of measurements during periods of unavailability due to maintenance.

While the above-described messaging sequence and collected measurement data support both round-trip delay (RTD) and data delivery ratio (DDR) network performance metrics, it will be understood that these metrics are separable and need not be determined in conjunction with each other, i.e., RTD can be determined without determining DDR, and DDR can be determined without determining RTD. Moreover, while equations (1) through (6) set forth specific expressions for determining RTD and DDR, the present invention is not limited to these specific expressions, and the timestamp and PDU count measurements can be used to calculate different or modified measures of network delay and percentages of successful (or unsuccessful) data transmission.

In accordance with another aspect of the present invention, the inter-probe message structure used to transmit inter-probe messages $M_1$ through $M_4$ is designed to allow each inter-probe message to be sent within a single PDU through the switching network, irrespective of the data transmission protocol(s) employed in the network, including ATM, Frame Relay, etc. This feature of the present invention advantageously permits the messaging scheme to be used with any conventional packet switching network, including interworked switching networks. This feature is achieved by minimizing the number of bytes required to send a single inter-probe message, so that the message can be encapsulated within the smallest PDUs used in the network, e.g., a single ATM cell. FIG. 4 illustrates the data payload of an inter-probe message according to the exemplary embodiment of the present invention. As seen in FIG. 4, the inter-probe message payload to be encapsulated within a PDU includes 20 bytes.

A one-byte "Version #" field identifies the product version number to which the message structure corresponds (e.g., a "2" indicates that the message structure corresponds to the second release of the product).

A one-byte "Message Type" field identifies the current state of the overall SLA message exchange, i.e., it identifies whether the message is $M_1$, $M_2$, $M_3$ or $M_4$. A value of 1 indicates that the message is the "initial request" message $M_1$; a value of 2 indicates that the message is the "reply$_B$" message $M_2$; a value of 3 indicates that the message is the "reply$_A$" message $M_3$; and a value of 4 indicates that the message is the "final reply" message $M_4$. Even if the probes on both ends of the VC begin an SLA message exchange with the same sequence number, the "Message Type" field is used to resolve the potential ambiguity.

A two-byte "Sequence #" field identifies the SLA message exchange of which the message is a part (somewhat analogous to the index "i" described above to denote the measurement cycle).

A four-byte "SlaUpTime" field is a count of seconds since the probe booted, SLA was enabled, or this particular circuit became available. The SlaUpTime of the reporting probe is included in the inter-probe message so that reboots, SLA enabling, and circuit reconfigurations can be detected and accounted for in the probes' calculations of delta PDU counts.

A four-byte "Last RX timestamp" field is the timestamp (in milliseconds and 1024ths of a millisecond) of when the probe received its last SLA message PDU. Specifically, for the reply$_B$ message $M_2$, this field contains the timestamp indicating the value of time $T_2$, and for the reply$_A$ message $M_3$, this field contains the timestamp indicating the value of time $T_4$. For messages $M_1$ and $M_4$, this field contains no valid data.

A four-byte "Last TX timestamp" field is the timestamp (in milliseconds and 1024ths of a millisecond) of when the probe offered its last SLA message PDU to the network. Specifically, for the reply$_A$ message $M_3$, this field contains the timestamp indicating the value of time $T_1$, and for final reply message $M_4$, this field contains the timestamp indicating the value of time $T_3$. For messages $M_1$ and $M_2$, this field contains no valid data.

Both timestamp fields consist of 22 bits of integer milliseconds (upper 22 bits) and 10 bits of 1024ths of a millisecond (lower 10 bits). This allows for about 69 minutes between timestamps before they wrap. Internal timestamp values are in milliseconds, but the fractional part allows for the potential of higher precision timestamps, and allows the serialization delay and internal delay factors to be combined with less accumulated round off error. The timestamps may be relative to the probe SlaUpTime.

A four-byte "non-burst offered PDUs" field is a free-running (raw) count of the number of PDUs offered to the network on the transmission circuit, recorded at the time the sending probe sent its first message in the message sequence. Specifically, for the reply$_A$ message $M_3$, this field contains the raw count, since counter initialization/rollover, of the PDUs offered by probe A up to time $T_1$ (the time at which probe A transmitted message $M_1$). For the final reply message $M_4$, this field contains the raw count, since counter initialization/rollover, of the PDUs offered by probe B up to time $T_3$ (the time at which probe B transmitted message $M_2$). For messages $M_1$ and $M_2$ in the message sequence, this field contains no valid data. The SlaUpTime is used to account for counter rollover and probe reboots.

32-bit unsigned counters can be used by probes A and B to store the PDU counts in order to ensure infrequent counter rollovers with these counts. Assuming a worst case of 128 octets frames at full DS3 (45 MBps), the 32-bit PDU counter will roll over only once every 27 hours. 45 MBps/(128*8)= 44,000 fps. $2^{32}$/44,000=97,600 secs=27 hours. If the rollover rate becomes unmanageable for higher transmission rates, this counter can be extended to 64 bits in a straight-forward manner.

The above-described message data payload is encapsulated in a PDU for transmission over the switching network. For probes operating under the DS3 ATM protocol, the size and format of the SLA message PDU is fixed. For probes operating under the Frame Relay protocol, the SLA message PDU size can be user selectable.

Specifically, for a 53 byte ATM message PDU, the PDU contains the following: a 5 byte ATM header; 8 bytes of encapsulation; 20 bytes of message payload; 12 bytes pad; and an 8 byte ATM ML5 trailer. For a Frame Relay message PDU, the PDU contains the following: 2 bytes of Frame Relay header; 8 bytes of encapsulation; 20 bytes of payload; 0 to 224 bytes of pad (to make total frame size 32 to 256 bytes); and 2 bytes of Frame Relay FCS.

As will be understood from the foregoing, a complete SLA message exchange involves 4 messages being sent: 1) probe A sends an "initial request" message $M_1$ to probe B; 2) probe B replies with a "reply$_B$" message $M_2$; probe A replies with a "reply$_A$" message $M_3$; and probe B replies with a "final reply" message $M_4$. The valid fields in the four messages are summarized in Table 2 (also see FIG. 2).

TABLE 2

| | Message Type Value | | | |
|---|---|---|---|---|
| Fields | 1 | 2 | 3 | 4 |
| T2 (last received) | | Valid | | |
| T4 (last received) | | | Valid | |
| T1 (last sent) | | | Valid | |
| T3 (last sent) | | | | Valid |
| Offered PDUs | | | Valid | Valid |

If at any point in an SLA message exchange, an expected message doesn't arrive within a predetermined period of time, e.g., 10 seconds, the entire SLA conversation is terminated. On the initiating side, the conversation is reinitiated. This initial request is sent three times before giving up. The sequence number for each subsequent initial request is one greater than the previous initial request sequence number.

The inter-probe messages must be uniquely identifiable from the user traffic so that they can be transparently inserted into and extracted from any legal Frame Relay, ATM or other protocol data stream.

A probe operating in the Frame Relay protocol can use RFC 1490 and SNAP ethertype encapsulation with a proprietary (e.g., Visual Networks, Inc.) SLA ethertype value for the inter-probe messages. This encapsulation method is used for SLA messages regardless of the user's network encapsulation configuration.

An exemplary eight byte RFC 1490 encapsulation header for Frame Relay (all values in Hex) is shown in Table 3.

TABLE 3

| Control | PAD | NLPID | OUI | Ethertype |
|---|---|---|---|---|
| 03 | 00 | 80 | 00 00 00 | 88 65 |

The "Ethertype" field in the last two bytes of the SNAP header identifies a proprietary protocol type of the packet. If the user data is also encapsulated with RFC 1490, there is no problem in differentiating the user data from the probe messages. If the user data is encapsulated with Cisco/ EtherType, the probe messages contain an invalid EtherType (03 00); thus, differentiation is easily achieved. Even if some other (proprietary) user data encapsulation is in use, it is highly unlikely that user data would be erroneously identified as an SLA message, because all 8 encapsulation bytes would be required to match. As a safeguard, however, a local configuration setting allows the user to disable SLA messaging.

A probe operating in the ATM protocol can use a similar technique based on RFC 1483 encapsulation. The RFC1483 header is followed by SNAP-Ethertype and a proprietary SLA Ethertype value. The resulting eight byte RFC 1483 encapsulation header for ATM (all values in Hex) is shown in Table 4.

TABLE 4

| DSAP | SSAP | Control | OUI | Ethertype |
|---|---|---|---|---|
| M | M | 03 | 00 00 00 | 88 65 |

While the above, messaging sequence protocol and message structure are particularly advantageous because of the ability to encapsulate each message within an single PDU of any conventional data transmission protocol, it will be understood that the present invention can be carried out with other message protocols and message structures. By way of example, in accordance with another embodiment of the present invention, the aforementioned time stamps and PDU counts are transmitted using an alternative messaging scheme which is particularly suited to the Frame Relay protocol.

Specifically, probe A send a first message $M_1$ containing a timestamp of the transmit time, $T_1$, and the count of the number of PDUs offered ($OFF_A(i)$) by site A (bound for site B) to the network up to time $T_1$. Since the time $T_1$ is not precisely known until message $M_1$ is actually transmitted, the transmitted values of $T_1$ and $OFF_A(i)$ are estimated.

When the message $M_1$ is received by probe B on the other end of the circuit, probe B records a timestamp of the receive time, $T_2$, of the message $M_1$. Probe B then sends a reply message $M_2$ back to probe A at time $T_3$. Message M2 includes timestamps indicating the values of times $T_2$ and $T_3$ as well as the count of number of PDUs offered ($OFF_B(i)$) by site B (bound for site A) to the network up to time $T_3$. Once again, time $T_3$ and PDU count $OFF_B(i)$ must be estimated, since they are not known precisely until the actual transmit time $T_3$ of the message $M_2$. Alternatively, timestamps $T_1$ and $T_3$ must be taken as close as possible to the actual time the messages are transmitted so that time spent waiting for idle time (a break in the user traffic) is not included in the measurement. Upon receiving the reply message $M_2$ at time $T_4$, probe A can compute the round-trip delay in accordance with equation (1). This final result is then sent back to probe B in one final message $M_3$, so that probe B can record the result as well (probe B is not sent a timestamp for time $T_4$ and cannot, therefore, calculate RTD).

The above-described inter-probe messages conform to message format shown in Table 5.

TABLE 5

| Byte 0 | Byte 1 | Byte 3 | Byte 4 |
|---|---|---|---|
| | Version # | | Message Type |
| | | Sequence # | |
| | | $T_1$ | |
| | | $T_2$ | |
| | | $T_3$ | |
| | | RTD (ms) | |
| | | SlaUpTime | |
| | | Non Burst Offered PDUs | |

. . . pad with 0x00 to 200 bytes (including encapulation layers)

The fields $T_1$, $T_2$ and $T_3$ contain the timestamps for times $T_1$, $T_2$ and $T_3$, respectively, and the RTD field contains the round trip delay time. The Measurement Type field indicates whether the message is an $M_1$, $M_2$ or $M_3$ type message. The remaining fields contain information similar to the information contained in the corresponding fields described above in conjunction with FIG. 4.

As will be understood from above, a complete message exchange sequence includes three messages: 1) probe A sends an "initial request" message to probe B; 2) probe B replies with a "reply" message; and 3) probe A replies with a "result reply" message. The valid fields in the four messages are summarized in Table 6.

TABLE 6

| | Message Type value | | |
|---|---|---|---|
| Fields | 0 | 1 | 2 |
| Sequence # | Valid | Valid | Valid |
| $T_1$ | Valid | Valid | Valid |
| $T_2$ | | Valid | Valid |
| $T_3$ | | Valid | Valid |
| RTD | | | Valid |
| Offered PDUs | Valid | Valid | |

To accommodate service level agreements that specify delay in terms of frame sizes other than 200 bytes, the inter-probe message size can be user programmable. Having described preferred embodiments of a new and improved method and apparatus for performing service level analysis of communications network performance metrics, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An apparatus for acquiring data used to perform service level analysis of network performance metrics in a data transmission system comprising at least a first site and a second site and at least a first data transmission circuit establishing a communication path through a switching network between the first and second sites, the apparatus comprising:

at least a first data acquisition device and a second data acquisition device respectively associated with said first and second sites;

said first data acquisition device inserting a first inter-device message into data traffic bound for the second site that is offered by the first site to the switching network over the first data transmission circuit, the first inter-device message delimiting a set of the data traffic bound for the second site from subsequent data traffic;

said second data acquisition device receiving the first inter-device message with data traffic originating from the first site and delivered by the switching network to the second site over the first data transmission circuit;

said first data acquisition device determining a count $OFF_A$ indicating an amount of data traffic offered by the first site in the set delimited by the first inter-device message;

said second data acquisition device determining a count $DEL_B$ indicating an amount of data traffic, in the set delimited by the first inter-device message, that is delivered by the switching network to the second site over the first data transmission circuit.

2. The apparatus of claim 1, wherein said first data acquisition device transmits the count $OFF_A$ to said second data acquisition device, and said second data acquisition device stores data delivery performance data based on the count $OFF_A$ and the count $DEL_B$.

3. The apparatus of claim 1, wherein:

said second data acquisition device inserts a second inter-device message into data traffic bound for the first site that is offered by the second site to the switching network over the first data transmission circuit, the second inter-device message delimiting a set of the data traffic bound for the first site from subsequent data traffic;

said first data acquisition device receiving the second inter-device message with data traffic originating from the second site and delivered by the switching network to the first site over the first data transmission circuit;

said second data acquisition device determining a count $OFF_B$ indicating an amount of data traffic offered by the second site in the set delimited by the second inter-device message; and said first data acquisition device determining a count $DEL_A$ indicating an amount of data traffic, in the set delimited by the second inter-device message, that is delivered by the switching network to the first site over the first data transmission circuit.

4. The apparatus of claim 3, wherein said second data acquisition device transmits the count $OFF_B$ to said first data acquisition device, and said first data acquisition device stores data delivery performance data based on the count $OFF_B$ and the count $DEL_A$.

5. The apparatus of claim 3, wherein:

said first data acquisition device transmits a plurality of first inter-device messages, such that successive first inter-device messages define first data collection intervals corresponding to successive sets of data traffic bound for the second site, said first data acquisition device determining the count $OFF_A$ for each of the first data collection intervals, and said second data acquisition device determining the count $DEL_B$ for each of the first data collection intervals;

said second data acquisition device transmits a plurality of second inter-device messages, such that successive second inter-device messages define second data collection intervals corresponding to successive sets of data traffic bound for the first site, said second data acquisition device determining the count $OFF_B$ for each of the second data collection intervals, and the first data acquisition device determining the count $DEL_A$ for each of the second data collection intervals.

6. The apparatus of claim 5, wherein:

for each of the first data collection intervals, at least one of said first and second data acquisition devices determines a count $\Delta DEL_A$ indicating a number of protocol data units (PDUs) originating from the second site that are delivered by the switching network to the first site over the first data transmission circuit during the first data collection interval, and a count $\Delta OFF_B$ indicating a number of PDUs bound for the first site that are offered by the second site to the switching network over the first data transmission circuit during the first data collection interval; and for each of the second data collection intervals, at least one of said first and second data acquisition devices determines a count $\Delta DEL_B$ indicating a number of PDUs originating from the first site that are delivered by the switching network to the second site over the first data transmission circuit during the second data collection interval, and a count $\Delta OFF_A$ indicating a number of PDUs bound for the second site that are offered by the first site to the switching network over the first data transmission circuit during the second data collection interval.

7. The apparatus of claim 6, further comprising a console in communication with said first and second data acquisition devices, wherein at least one of said console, said first data acquisition device and said second data acquisition device determines data delivery performance of the first data transmission circuit as a function of the counts $\Delta DEL_A$, $\Delta OFF_B$, $\Delta DEL_B$ and $\Delta OFF_A$.

8. The apparatus of claim 7, wherein at least one of said console, said first data acquisition device and second data acquisition device calculates a data delivery ratio of a number of PDUs delivered on the first data transmission circuit by the switching network to a number of PDUs offered to the switching network on the first transmission circuit as $(\Delta DEL_A + \Delta DEL_B)/(\Delta OFF_A + \Delta OFF_B)$.

9. The apparatus of claim 7, wherein at least one of said console, said first data acquisition device and said second data acquisition device determines a round trip delay of data transmitted over the first data transmission circuit based on the transmit and receive times of the first and second inter-device messages.

10. The apparatus of claim 7, wherein at least one of said console, said first data acquisition device and said second data acquisition device determines an amount of time that the first data transmission circuit was available during a predetermined time period.

11. The apparatus of claim 6, wherein:

said first data acquisition device computes a one-way data delivery performance metric for the first data transmission circuit as a function of the counts $\Delta DEL_A$ and $\Delta OFF_B$; and said second data acquisition device computes a one-way data delivery performance metric for the first data transmission circuit as a function of the counts $\Delta DEL_B$ and $\Delta OFF_A$.

12. The apparatus of claim 11, wherein:

said first data acquisition device calculates a one-way data delivery ratio of a number of PDUs originating from the second site that are delivered by the switching network to the first site over the first data transmission circuit to a number of PDUs bound for the first site that are offered by the second site to the switching network over the first data transmission circuit as $\Delta DEL_A/\Delta OFF_B$; and said second data acquisition device calculates a one-way data delivery ratio of a number of PDUs originating from the first site that are delivered by the switching network to the second site over the first data transmission circuit to a number of PDUs bound for the second site that are offered by the first site to the switching network over the first data transmission circuit as $\Delta DEL_B/\Delta OFF_A$.

13. The apparatus of claim 3, wherein said first and second data acquisition devices exchange a sequence of inter-device messages over the first transmission circuit, the sequence of inter-device messages including said first and second inter-device messages, wherein the count $OFF_A$ is transmitted from said first data acquisition device to said second data acquisition device in a message in the sequence of inter-device messages, and the count $OFF_B$ is transmitted from said second data acquisition device to said first data acquisition device in a message in the sequence of inter-device messages.

14. The apparatus of claim 13, wherein said first and second data acquisition devices form each message of the sequence of inter-device messages in accordance with an inter-device message structure, wherein each inter-device message includes: a message type field identifying the inter-device message as a particular message within the sequence; and a count field for transmitting a count indicating an amount of data traffic offered to the switching network for transmission over the first data transmission circuit.

15. The apparatus of claim 14, wherein said first and second data acquisition devices form each message of the sequence of inter-device messages in accordance with the inter-device message structure, wherein each inter-device message further includes:

at least one timestamp field for transmitting timestamp data relating to timing of a message in the sequence.

16. The apparatus of claim 15, wherein said at least one timestamp field includes:

a first timestamp field for transmitting timestamp data indicating a time at which a previous message in the sequence was received; and a second timestamp field for transmitting timestamp data indicating a time at which a previous message in the sequence was transmitted.

17. The apparatus of claim 15, said first and second data acquisition devices form each message of the sequence of inter-device messages such that each message is capable of being encapsulated in a single ATM cell and in a single frame relay frame.

18. The apparatus of claim 3, wherein:

said first data acquisition device maintains the count $OFF_A$ indicating a number of protocol data units (PDUs) bound for the second site that are offered by the first site to the switching network over the first data transmission circuit;

said first data acquisition device maintains the count $DEL_A$ indicating a number of PDUs originating from the second site that are delivered by the switching network to the first site over the first data transmission circuit;

said second data acquisition device maintains the count $OFF_B$ indicating a number of PDUs bound for the first site that are offered by the second site to the switching network over the first data transmission circuit; and said second data acquisition device maintains the count $DEL_B$ indicating a number of PDUs originating from the first site that are delivered by the switching network to the second site over the first data transmission circuit.

19. The apparatus of claim 18, wherein:

the counts $OFF_A$, $OFF_B$, $DEL_A$ and $DEL_B$ maintained by said first and second data acquisition devices are running totals counted from a time of counter initialization or a time of counter rollover; and said first and second data acquisition devices subtract counts from previous data collection intervals from the counts $OFF_A$, $OFF_B$, $DEL_A$ and $DEL_B$ to determine numbers of PDUs offered and delivered by said first and second data acquisition devices over the first data transmission circuit during a latest data collection interval.

20. The apparatus of claim 18, wherein the counts $OFF_A$, $OFF_B$, $DEL_A$ and $DEL_B$ maintained by said first and second data acquisition devices indicate numbers of PDUs offered and delivered by said first and second data acquisition devices during individual data collection intervals.

21. The apparatus of claim 3, wherein, said first and second data acquisition devices exchange a sequence of inter-device messages, such that:

said first data acquisition device transmits the first inter-device message to said second data acquisition device at a transmit time $T_1$, the first inter-device message being received at said second data acquisition device at time $T_2$;

said second data acquisition device determines the count $DEL_B$ as of time $T_2$;

said second data acquisition device transmits the second inter-device message to said first data acquisition device at a transmit time $T_3$, the second inter-device message being received at said first data acquisition device at time $T_4$;

said first data acquisition device determines the count $DEL_A$ as of time $T_4$;

said first data acquisition device transmits a third inter-device message to said second data acquisition device containing the count $OFF_A$ as of time $T_1$; and said second data acquisition device transmits a fourth inter-device message to said first data acquisition device containing the count $OFF_B$ as of time $T_3$.

22. The apparatus of claim 21, wherein said first and second data acquisition devices exchange the sequence of inter-device messages during a periodic measurement cycle.

23. The apparatus of claim 22, wherein said first and second data acquisition devices exchange the sequence of inter-device messages containing data collected during a data collection interval terminating during the periodic measurement cycle.

24. The apparatus of claim 21, wherein:

the third inter-device message contains timestamp information indicating values of the transmit time $T_1$ of the first message and the receive time $T_4$ of the second message; and said second data acquisition device calculates the round trip delay over the first transmission circuit using the values of times $T_1$, $T_2$, $T_3$ and $T_4$.

25. The apparatus of claim 24, wherein:

the second inter-device message contains timestamp information indicating a value of the receive time $T_2$ of the first message;

the fourth inter-device message contains timestamp information indicating a value of the transmit time $T_3$ of the second message; and said first data acquisition device calculates the round trip delay over the first transmission circuit using the values of times $T_1$, $T_2$, $T_3$ and $T_4$.

26. The apparatus of claim 3, wherein:

the switching network is an interworked network employing plural, different data transmission protocols;

said first data acquisition device constructs the first inter-device message such that the first inter-device message is capable of being encapsulated in a single protocol data unit of each of the plural data transmission protocols; and said second data acquisition device constructs the second inter-device message such that the second inter-device message is capable of being encapsulated in a single protocol data unit of each of the plural data transmission protocols.

27. The apparatus of claim 26, wherein:

the interworked network includes an asynchronous transfer mode (ATM) network employing an ATM data transmission protocol and a frame relay network employing a frame relay data transmission protocol;

the first site is a site on one of the ATM network and the frame relay network, and the second site is a site on the other of the ATM network and the frame relay network;

said first data acquisition device constructs the first inter-device message such that the first inter-device message is capable of being encapsulated in a single ATM cell and a single frame relay frame; and said second data acquisition device constructs the second inter-device message such that the second inter-device message is capable of being encapsulated in a single ATM cell and a single frame relay frame.

28. An apparatus for measuring round-trip delay in a data transmission system comprising at least a first site and a second site and at least a first data transmission circuit establishing a communication path through a switching network between the first and second sites, the apparatus comprising:

at least a first data acquisition device and a second data acquisition device respectively associated with said first and second sites and being configured to exchange a sequence of inter-device messages, such that:

said first data acquisition device transmits a first message to said second data acquisition device at time $T_1$, the first message being received at said second data acquisition device at time $T_2$;

said second data acquisition device transmits at time $T_3$ a second message to said first data acquisition, the second message being received at said first data acquisition device at time $T_4$;

said first data acquisition device transmits to said second data acquisition device a third message containing timestamp information indicating values of the transmit time $T_1$ of the first message and receive time $T_4$ of the second message; and said second data acquisition device calculates the round trip delay over the first transmission circuit using the values of times $T_1$, $T_2$, $T_3$ and $T_4$.

29. The apparatus of claim 28, wherein said second data acquisition device computes the round trip delay as:

$(T_4-T_3)+(T_2-T_1)$.

30. The apparatus of claim 29, wherein:

said second data acquisition device transmits in the second message timestamp information indicating a value of the receive time $T_2$ of the first message;

said second data acquisition device transmits to said first data acquisition device a fourth message containing timestamp information indicating a value of the transmit time $T_3$ of the second message; and said first data acquisition device calculates the round trip delay over the first transmission circuit using the values of times $T_1$, $T_2$, $T_3$ and $T_4$.

31. The apparatus of claim 30, wherein said first data acquisition device computes the round trip delay as:

$(T_4-T_3)+(T_2-T_1)$.

32. A data transmission system capable of performing service level analysis of network performance metrics, comprising:
a switching network;
at least a first site and a second site;
at least a first data transmission circuit establishing a communication path through the switching network between the first and second sites;
at least a first data acquisition device and a second data acquisition device respectively associated with said first and second sites; and
a console in communication with at least one of said first and second data acquisition devices;
said first data acquisition device being configured to: collect first performance data related to performance of said first transmission circuit; insert a first inter-device message into data traffic bound for the second site that is offered by the first site to the switching network over the first data transmission circuit; and use the first inter-device message to delimit a set of the data traffic for which the first performance data is collected;
said second data acquisition device being configured to: receive the first inter-device message with data traffic originating from the first site and delivered by the switching network to the second site over the first data transmission circuit; and collect second performance data related to performance of said first transmission circuit for the set of data traffic delimited by the first inter-device message;
at least one of said first data acquisition device, said second data acquisition device and said console generating service level analysis data of at least one network performance metric from the first and second performance data; and
said console providing as an output the service level analysis data.

33. The system of claim 32, wherein said first data acquisition device transmits the first performance data to said second data acquisition device, and said second data acquisition device stores historical performance data based on the first and second performance data.

34. The system of claim 32, wherein:
said second data acquisition device is configured to: collect third performance data related to performance of said first transmission circuit; insert a second inter-device message into data traffic bound for the first site that is offered by the second site to the switching network over the first data transmission circuit; and use the second inter-device message to delimit a set of the data traffic on which the third performance data is collected;
said first data acquisition device is configured to: receive the second inter-device message with data traffic originating from the second site and delivered by the switching network to the first site over the first data transmission circuit; and collect fourth performance data related to performance of said first transmission circuit for the set of data traffic delimited by the second inter-device message;
at least one of said first data acquisition device, said second data acquisition device and said console generates service level analysis data of at least one network performance metric from the first, second, third and fourth performance data; and
said console provides as an output the service level analysis data.

35. The system of claim 34, wherein said second data acquisition device transmits the third performance data to said first data acquisition device, and said first data acquisition device stores historical performance data based on the third and fourth performance data.

36. The system of claim 34, wherein:
said first performance data collected by said first data acquisition device indicates an amount of data traffic offered by the first site in the set delimited by the first inter-device message;
said second performance data collected by said second data acquisition device indicates an amount of data traffic, in the set delimited by the first inter-device message, that is delivered by the switching network to the second site over the first data transmission circuit;
said third performance data collected by said second data acquisition device indicates an amount of data traffic offered by the second site in the set delimited by the second inter-device message; and
said fourth performance data collected by said first data acquisition device indicates an amount of data traffic, in the set delimited by the second inter-device message, that is delivered by the switching network to the first site over the first data transmission circuit.

37. The system of claim 34, wherein at least one of said first data acquisition device, said second data acquisition device and said console determines data delivery performance of the first data transmission circuit from the first, second, third and fourth performance data.

38. The system of claim 34, wherein:
said first data acquisition device determines as the first performance data a count $OFF_A$ indicating a number of protocol data units (PDUs) bound for the second site that are offered by the first site to the switching network over the first data transmission circuit;
said first data acquisition device maintains as the fourth performance data a count $DEL_A$ indicating a number of PDUs originating from the second site that are delivered by the switching network to the first site over the first data transmission circuit;
said second data acquisition device maintains as the third performance data a count $OFF_B$ indicating a number of PDUs bound for the first site that are offered by the second site to the switching network over the first data transmission circuit; and
said second data acquisition device maintains as the second performance data a count $DEL_B$ indicating a number of PDUs originating from the first site that are delivered by the switching network to the second site over the first data transmission circuit.

39. The system of claim 38, wherein:
said first data acquisition device transmits a plurality of first inter-device messages, such that successive first inter-device messages define first data collection intervals corresponding to successive sets of data traffic bound for the second site, said first data acquisition device determining the count $OFF_A$ for each of the first data collection intervals, and said second data acquisition device determining the count $DEL_B$ for each of the first data collection intervals;
said second data acquisition device transmits a plurality of second inter-device messages, such that successive second inter-device messages define second data collection intervals corresponding to successive sets of data traffic bound for the first site, said second data acquisition device determining the count $OFF_B$ for each of the second data collection intervals, and the first data acquisition device determining the count $DEL_A$ for each of the second data collection intervals.

40. The system of claim 39, wherein:

for each of the first data collection intervals, at least one of said first data acquisition device, said second data acquisition device and said console determines a count $\Delta DEL_B$ indicating a number of PDUs originating from the first site that are delivered by the switching network to the second site over the first data transmission circuit during the first data collection interval, and a count $\Delta OFF_A$ indicating a number of PDUs bound for the second site that are offered by the first site to the switching network over the first data transmission circuit during the second data collection interval; and for each of the second data collection intervals, at least one of said first data acquisition device, said second data acquisition device and said console determines a count $\Delta DEL_A$ indicating a number of PDUs originating from the second site that are delivered by the switching network to the first site over the first data transmission circuit during the second data collection interval, and a count $\Delta OFF_B$ indicating a number of PDUs bound for the first site that are offered by the second site to the switching network over the first data transmission circuit during the second data collection interval.

41. The system of claim 40, wherein at least one of said console, said first data acquisition device and said second data acquisition device determines data delivery performance of the first data transmission circuit as a function of the counts $\Delta DEL_A$, $\Delta OFF_B$, $\Delta DEL_B$ and $\Delta OFF_A$.

42. The system of claim 41, wherein at least one of said console, said first data acquisition device and second data acquisition device calculates a data delivery ratio of a number of PDUs delivered on the first data transmission circuit by the switching network to a number of PDUs offered to the switching network on the first transmission circuit as $(\Delta DEL_A + \Delta DEL_B)/(\Delta OFF_A + \Delta OFF_B)$.

43. The system of claim 40, wherein:

the counts $OFF_A$, $OFF_B$, $DEL_A$ and $DEL_B$ maintained by said first and second data acquisition devices are running totals counted from a time of counter initialization or a time of counter rollover, and the counts $\Delta OFF_A$, $\Delta OFF_B$, $\Delta DEL_A$ and $\Delta DEL_B$ are determined by subtracting counts from previous data collection intervals from the counts $OFF_A$, $OFF_B$, $DEL_A$ and $DEL_B$.

44. The system of claim 39, wherein said first and second data acquisition devices exchange a sequence of inter-device messages over the first transmission circuit, the sequence of inter-device messages including said first and second inter-device messages, wherein at least one of the first and third performance data is transmitted between said first and second data acquisition devices in a message in the sequence of inter-device messages.

45. The system of claim 44, wherein at least one of said console, said first data acquisition device and said second data acquisition device determines a round trip delay of data transmitted over the first data transmission circuit using timestamp data transmitted in the sequence of inter-device messages.

46. The system of claim 44, wherein at least one of said first data acquisition device, said second data acquisition device and said console generates performance data indicating an amount of time that said first data transmission circuit was available during a predetermined time period.

47. The system of claim 44, wherein, said first and second data acquisition devices exchange the sequence of inter-device messages, such that:

said first data acquisition device transmits the first inter-device message to said second data acquisition device at a transmit time $T_1$, the first inter-device message being received at said second data acquisition device at time $T_2$;

said second data acquisition device determines the count $DEL_B$ as of time $T_2$;

said second data acquisition device transmits the second inter-device message to said first data acquisition device at a transmit time $T_3$, the second inter-device message being received at said first data acquisition device at time $T_4$;

said first data acquisition device determines the count $DEL_A$ as of time $T_4$;

said first data acquisition device transmits a third inter-device message to said second data acquisition device containing the count $OFF_A$ as of time $T_1$; and said second data acquisition device transmits a fourth inter-device message to said first data acquisition device containing the count $OFF_B$ as of time $T_3$.

48. The system of claim 47, wherein:

the second inter-device message contains timestamp information indicating a value of the receive time $T_2$;

the third inter-device message contains timestamp information indicating values of the transmit time $T_1$ of the first inter-device message and the receive time $T_4$ of the second inter-device message;

the fourth inter-device message contains timestamp information indicating a value of the transmit time $T_3$ of the second message; and at least one of said first data acquisition device, said second data acquisition device and said console calculates the round trip delay as:
$(T_4-T_3)+(T_2-T_1)$.

49. The system of claim 34, wherein:

said switching network is an interworked network employing plural, different data transmission protocols;

said first data acquisition device constructs the first inter-device message such that the first inter-device message is capable of being encapsulated in a single protocol data unit of each of the plural data transmission protocols; and said second data acquisition device constructs the second inter-device message such that the second inter-device message is capable of being encapsulated in a single protocol data unit of each of the plural data transmission protocols.

50. The system of claim 49, wherein:

the interworked network includes an asynchronous transfer mode (ATM) network employing an ATM data transmission protocol and a frame relay network employing a frame relay data transmission protocol;

the first site is a site on one of the ATM network and the frame relay network, and the second site is a site on the other of the ATM network and the frame relay network;

said first data acquisition device constructs the first inter-device message such that the first inter-device message is capable of being encapsulated in a single ATM cell and a single frame relay frame; and said second data acquisition device constructs the second inter-device message such that the second inter-device message is capable of being encapsulated in a single ATM cell and a single frame relay frame.

51. A method of performing service level analysis of network performance metrics in a data transmission system that includes at least first and second sites; at least first and second data acquisition devices respectively associated with the first and second sites; and at least a first data transmission circuit establishing a communication path through a switching network between the first and second sites, the method comprising the steps of:
 (a) collecting, at the first data acquisition device, first performance data related to performance of the first transmission circuit;
 (b) collecting, at the second data acquisition device, second performance data related to performance of the first transmission circuit;
 (c) inserting a first inter-device message into data traffic bound for the second site that is offered by the first site to the switching network over the first data transmission circuit;
 (d) using the first inter-device message to delimit a set of the data traffic for which the first and second performance data are collected; and
 (e) generating service level analysis data of at least one network performance metric from the first and second performance data.

52. The method of claim 51, further comprising the steps of:
 (f) transmitting to the second data acquisition device a value of the first performance data; and
 (g) storing at the second data acquisition device historical performance data based on the values of the first and second performance data.

53. The method of claim 51, further comprising the steps of:
 (f) collecting, at the second data acquisition device, third performance data related to performance of the first transmission circuit;
 (g) collecting, at the first data acquisition device, fourth performance data related to performance of the first transmission circuit;
 (h) inserting a second inter-device message into data traffic bound for the first site that is offered by the second site to the switching network over the first data transmission circuit; and
 (i) using the second inter-device message to delimit a set of the data traffic for which the third and fourth performance data are collected;
 wherein step (e) includes generating service level analysis data of at least one network performance metric from the first, second, third and fourth performance data.

54. The method of claim 53, further comprising the steps of:
 (k) transmitting to the first data acquisition device a value of the third performance data; and
 (l) storing at the first data acquisition device historical performance data based on the values of the third and fourth performance data.

55. The method of claim 53, wherein:
 step (a) includes maintaining as the first performance data an indication of an amount of data traffic offered by the first site in the set delimited by the first inter-device message;

step (b) includes maintaining as the second performance data an indication of an amount of data traffic, in the set delimited by the first inter-device message, that is delivered by the switching network to the second site over the first data transmission circuit;
 step (f) includes maintaining as the third performance data an indication of an amount of data traffic offered by the second site in the set delimited by the second inter-device message; and
 step (g) includes maintaining as the fourth performance data an indication of an amount of data traffic, in the set delimited by the second inter-device message, that is delivered by the switching network to the first site over the first data transmission circuit.

56. The method of claim 53, wherein step (e) includes determining data delivery performance of the first data transmission circuit from the first, second, third and fourth performance data.

57. The method of claim 53, wherein:
 step (a) includes maintaining as the first performance data a count $OFF_A$ indicating a number of protocol data units (PDUs) bound for the second site that are offered by the first site to the switching network over the first data transmission circuit;
 step (b) includes maintaining as the second performance data a count $DEL_B$ indicating a number of PDUs originating from the first site that are delivered by the switching network to the second site over the first data transmission circuit;
 step (f) includes maintaining as the third performance data a count $OFF_B$ indicating a number of PDUs bound for the first site that are offered by the second site to the switching network over the first data transmission circuit; and
 step (g) includes maintaining as the fourth performance data a count $DEL_A$ indicating a number of PDUs originating from the second site that are delivered by the switching network to the first site over the first data transmission circuit.

58. The method of claim 57, wherein:
 step (c) includes inserting a plurality of first inter-device messages into data traffic originating from the first site and bound for the second site, such that successive first inter-device messages define first data collection intervals corresponding to successive sets of data traffic bound for the second site;
 step (a) includes determining the count $OFF_A$ for each of the first data collection intervals;
 step (b) includes determining the count $DEL_B$ for each of the first data collection intervals;
 step (h) includes inserting a plurality of second inter-device messages into data traffic originating from the second site and bound for the first site, such that successive second inter-device messages define second data collection intervals corresponding to successive sets of data traffic bound for the first site;
 step (f) includes determining the count $OFF_B$ for each of the first data collection intervals; and
 step (g) includes determining the count $DEL_A$ for each of the first data collection intervals.

59. The method of claim 58, further comprising the steps of:
 (j) determining, for each of the first data collection intervals, a count $\Delta DEL_B$ indicating a number of PDUs originating from the first site that are delivered by the switching network to the second site over the first data transmission circuit during the first data collection interval, and a count $\Delta OFF_A$ indicating a number of PDUs bound for the second site that are offered by the first site to the switching network over the first data transmission circuit during the second data collection interval; and (k) determining, for each of the second data collection intervals, a count $\Delta DEL_A$ indicating a number of PDUs originating from the second site that are delivered by the switching network to the first site over the first data transmission circuit during the second data collection interval, and a count $\Delta OFF_B$ indicating a number of PDUs bound for the first site that are offered by the second site to the switching network over the first data transmission circuit during the second data collection interval.

60. The method of claim 59, wherein step (e) includes determining data delivery performance of the first data transmission circuit as a function of the counts $\Delta DEL_A$, $\Delta OFF_B$, $\Delta DEL_B$ and $\Delta OFF_A$.

61. The method of claim 60, wherein step (e) includes calculating a data delivery ratio of a number of PDUs delivered on the first data transmission circuit by the switching network to a number of PDUs offered to the switching network on the first transmission circuit as $(\Delta DEL_A + \Delta DEL_B)/(\Delta OFF_A + \Delta OFF_B)$.

62. The method of claim 59, wherein:
steps (a), (f), (g) and (b) respectively include determining the counts $OFF_A$, $OFF_B$, $DEL_A$ and $DEL_B$ as running totals counted from a time of counter initialization or a time of counter rollover; and
steps (j) and (k) include determining the counts $\Delta OFF_A$, $\Delta OFF_B$, $\Delta DEL_A$ and $\Delta DEL_B$ by subtracting counts from previous data collection intervals from the counts $OFF_A$, $OFF_B$, $DEL_A$ and $DEL_B$.

63. The method of claim 58, wherein said first and second data acquisition devices exchange a sequence of inter-device messages over the first transmission circuit, the sequence of inter-device messages including said first and second inter-device messages, the method further comprising the step of:
(j) transmitting at least one of the first and third performance data between said first and second data acquisition devices in a message in the sequence of inter-device messages.

64. The method of claim 63, further comprising the step of:
(k) determining a round trip delay of data transmitted over the first data transmission circuit using timestamp data transmitted in the sequence of inter-device messages.

65. The method of claim 63, further comprising the step of:
(k) generating performance data indicating an amount of time that said first data transmission circuit was available during a predetermined time period.

66. The method of claim 63, wherein:
step (c) includes transmitting the first inter-device message to said second data acquisition device at a transmit time $T_1$, the first inter-device message being received at said second data acquisition device at time $T_2$;
step (a) includes determining the count $OFF_A$ as of time $T_1$;
step (b) includes determining the count $DEL_B$ as of time $T_2$;
step (h) includes transmitting the second inter-device message to said first data acquisition device at a trans-
mit time $T_3$, the second inter-device message being received at said first data acquisition device at time $T_4$;
step (f) includes determining the count $OFF_B$ as of time $T_3$;
step (g) includes determining the count $DEL_A$ as of time $T_4$;
the method further comprising the steps of:
(k) transmitting a third inter-device message to said second data acquisition device containing the count $OFF_A$; and
(l) transmitting a fourth inter-device message to said first data acquisition device containing the count $OFF_B$.

67. The method of claim 66, wherein:
step (h) includes transmitting timestamp information indicating a value of the receive time $T_2$ within the second inter-device message;
step (k) includes transmitting timestamp information indicating values of the transmit time $T_1$ of the first inter-device message and the receive time $T_4$ of the second inter-device message in the third inter-device message;
step (l) includes transmitting timestamp information indicating a value of the transmit time $T_3$ of the second message in the fourth inter-device message;
the method further comprising the step of:
(m) calculating the round trip delay as: $(T_4-T_3)+(T_2-T_1)$.

68. The method of claim 53, wherein the switching network is an interworked network employing plural, different data transmission protocols;
step (c) includes constructing the first inter-device message such that the first inter-device message is capable of being encapsulated in a single protocol data unit of each of the plural data transmission protocols; and
step (h) includes constructing the second inter-device message such that the second inter-device message is capable of being encapsulated in a single protocol data unit of each of the plural data transmission protocols.

69. The method of claim 68, wherein:
the interworked network includes an asynchronous transfer mode (ATM) network employing an ATM data transmission protocol and a frame relay network employing a frame relay data transmission protocol, the first site is a site on one of the ATM network and the frame relay network, and the second site is a site on the other of the ATM network and the frame relay network, wherein
step (c) includes constructing the first inter-device message such that the first inter-device message is capable of being encapsulated in a single ATM cell and a single frame relay frame; and
step (h) includes constructing the second inter-device message such that the second inter-device message is capable of being encapsulated in a single ATM cell and a single frame relay frame.

70. A method of measuring data delivery performance of a data transmission circuit forming a transmission path between a first site and a second site through a switching network over which the first and second sites communicate, the method comprising the steps of:
(a) maintaining at a first site end of the data transmission circuit a count $OFF_A$ of a number of protocol data units (PDUs) bound for the second site that are offered by the first site to the switching network over the data transmission circuit;

(b) maintaining at the first site end a count $DEL_A$ of a number of PDUs originating from the second site that are delivered by the switching network to the first site over the data transmission circuit;

(c) maintaining at a second site end of the data transmission circuit a count $OFF_B$ of a number of PDUs bound for the first site that are offered by the second site to the switching network over the data transmission circuit;

(d) maintaining at the second site end a count $DEL_B$ of a number of PDUs originating from the first site that are delivered by the switching network to the second site over the data transmission circuit; and (e) computing a measure of PDU delivery performance of the data transmission circuit from the counts $OFF_A$, $OFF_B$, $DEL_A$ and $DEL_B$.

71. The method of claim 70, wherein step (e) includes calculating a data delivery ratio as the ratio of the number of PDUs delivered by the switching network to the first and second sites over the data transmission circuit to the number of PDUs offered to the switching network by the first and second sites for transmission over the data transmission circuit.

72. The method of claim 70, further comprising the steps of:

(f) periodically transmitting the count $OFF_A$ from the first site end to the second site end over the data transmission circuit;

(g) periodically transmitting the count $OFF_B$ from the second site end to the first site end over the data transmission circuit;

(h) periodically storing at the first site end of the data transmission circuit a count $\Delta OFF_B$ of a number of PDUs bound for the first site that were offered by the second site to the switching network over the data transmission circuit during a data collection interval, and a count $\Delta DEL_A$ of a number of PDUs originating from the second site that were delivered by the switching network to the first site over the data transmission circuit during the data collection interval; and (i) periodically storing at the second site end of the data transmission circuit a count $\Delta OFF_A$ of a number of PDUs bound for the second site that were offered by the first site to the switching network over the data transmission circuit during a data collection interval and a count $\Delta DEL_B$ of a number of PDUs originating from the first site that were delivered by the switching network to the second site over the data transmission circuit during the data collection interval;

wherein step (e) includes computing the measure of PDU delivery performance from the counts periodically stored in steps (h) and (i).

73. The method of claim 72, wherein step (e) includes calculating a data delivery ratio as the ratio of the number of PDUs delivered by the switching network to the first and second sites over the data transmission circuit to the number of PDUs offered to the switching network by the first and second sites for transmission over the data transmission circuit as $(\Delta DEL_A + \Delta DEL_B)/(\Delta OFF_A + \Delta OFF_B)$.

74. A method of calculating a round trip delay of data transmitted over a data transmission circuit forming a path through a packetized switching network between first and second sites, comprising the steps of:

(a) transmitting a first message from a first data acquisition device associated with the first site to a second data acquisition device associated with the second site at time $T_1$, the first message being received at the second data acquisition device at time $T_2$;

(b) transmitting a second message from the second data acquisition device to the first data acquisition device at time $T_3$, the second message being received at the first data acquisition device at time $T_4$;

(c) transmitting a third message from the first data acquisition device to the second data acquisition device containing timestamp information indicating values of the transmit time $T_1$ of the first message and the receive time $T_4$ of the second message; and (d) computing the round trip delay using the values of times $T_1$, $T_2$, $T_3$ and $T_4$.

75. The method of claim 74, wherein step (d) includes computing the round trip delay as:

$(T_4-T_3)+(T_2-T_1)$.

76. The method of claim 74, wherein step (b) includes transmitting in the second message timestamp information containing a value of the receive time $T_2$ of the first message, the method further comprising the step of:

(e) transmitting from the second data acquisition device to the first data acquisition device a fourth message containing a value of the transmit time $T_3$ of the second message;

wherein step (d) is performed by both the first data acquisition device and the second data acquisition device.

77. The method of claim 76, wherein step (d) includes computing the round trip delay as:

$(T_4-T_3)+(T_2-T_1)$.

78. A data transmission structure for transmitting a sequence of inter-device messages over a data transmission circuit forming a path through a switching network between first and second sites, the switching network employing at least one data transmission protocol, the structure comprising:

a message type field identifying the inter-device message as a particular message within the sequence; and a count field for transmitting an indicator of a number of protocol data units (PDUs) offered for transmission to the switching network over the data transmission circuit, wherein, when said message type field contains a first value, said count field contains a count $OFF_A$ indicating a number of PDUs bound for the second site that are offered by the first site to the switching network over the first transmission circuit, and when said message type field contains a second value, said count field contains a count $OFF_B$ indicating a number of PDUs bound for the first site that are offered by the second site to the switching network over the first transmission circuit;

wherein each inter-device message conforming to the data transmission structure is capable of being encapsulated in a single protocol data unit of said at least one data transmission protocol.

79. The structure of claim 78, wherein the switching network is an interworked switching network employing plural, different data transmission protocols, wherein each inter-device message conforming to the data transmission structure is capable of being encapsulated in a single protocol data unit of each of the plural data transmission protocols.

80. The structure of claim 79, wherein said plural data transmission protocols includes at least one of: Asynchronous Transfer Mode (ATM), Frame Relay, High Level Data Link Control (HDLC), X.25, and tunneled protocols.

81. The structure of claim 79, wherein:

the interworked network includes an asynchronous transfer mode (ATM) network employing an ATM data transmission protocol and a frame relay network employing a frame relay data transmission protocol;

the first site is a site on one of the ATM network and the frame relay network, and the second site is a site on the other of the ATM network and the frame relay network; and each inter-device message conforming to the data transmission structure is capable of being encapsulated in a single ATM cell and in a single frame relay frame.

82. The structure of claim 78, wherein:

the sequence of data measurement messages includes first and third messages transmitted over the data transmission circuit from the first site to the second site in accordance with the data transmission structure, and second and fourth messages transmitted over the data transmission circuit from the second site to the first site in accordance with the data transmission structure;

when said message type field identifies the inter-device message as the third message in the sequence, said count field contains the count $OFF_A$; and when said message type field identifies the inter-device message as the fourth message in the sequence, the count field contains the count $OFF_B$.

83. The structure of claim 78, further comprising:

a first timestamp field for transmitting timestamp data indicating a time at which a previous message in the sequence was received; and a second timestamp field for transmitting timestamp data indicating a time at which a previous message in the sequence was transmitted.

84. The structure of claim 83, wherein:

the sequence of data measurement messages includes first and third messages transmitted over the data transmission circuit from the first site to the second site in accordance with the data transmission structure, and second and fourth messages transmitted over the data transmission circuit from the second site to the first site in accordance with the data transmission structure;

when said message type field identifies the inter-device message as the second message in the sequence, said first timestamp field indicates a receive time of the first message;

when said message type field identifies the inter-device message as the third message in the sequence, said first timestamp field indicates a receive time of the second message, said second timestamp field indicates a transmit time of the first message, and said count field contains the count $OFF_A$; and when said message type field identifies the inter-device message as the fourth message in the sequence, said second timestamp field indicates a transmit time of the second message, and the count field contains the count $OFF_B$.

85. A method of transmitting a sequence of inter-device messages over a data transmission circuit forming a path through a switching network between first and second sites, the switching network employing at least one data transmission protocol, the inter-device messages containing data relating to transmission performance of the data transmission circuit, the method comprising the steps of:

(a) forming each of the inter-device messages in the sequence in accordance with an inter-device message transmission structure, such that each of the inter-device messages is capable of being encapsulated in a single protocol data unit of said at least one data transmission protocol of the switching network, wherein each inter-device message includes: a message type field identifying the inter-device message as a particular message within the sequence; and a count field for transmitting an indicator of a number of protocol data units (PDUs) offered for transmission to the switching network over the data transmission circuit, wherein, when the message type field contains a first value, the count field contains a count $OFF_A$ indicating a number of PDUs bound for the second site that are offered by the first site to the switching network over the first transmission circuit, and when the message type field contains a second value, the count field contains a count $OFF_B$ indicating a number of PDUs bound for the first site that are offered by the second site to the switching network over the first transmission circuit;

(b) inserting each of the inter-device messages into data traffic to be transmitted on the data transmission circuit between the first and second sites; and (c) extracting the inter-device messages from the data traffic transmitted on the data transmission circuit.

86. The method of claim 85, wherein the switching network is an interworked switching network employing plural, different data transmission protocols, and wherein step (a) includes forming each of the inter-device messages, such that each of the inter-device messages is capable of being encapsulated in a single protocol data unit of each of the plural data transmission protocols of the interworked network.

87. The method of claim 86, wherein said plural data transmission protocols includes at least one of: Asynchronous Transfer Mode (ATM), Frame Relay, High Level Data Link Control (HDLC), X.25, and tunneled protocols.

88. The method of claim 86, wherein:

the interworked network includes an asynchronous transfer mode (ATM) network employing an ATM data transmission protocol and a frame relay network employing a frame relay data transmission protocol;

the first site is a site on one of the ATM network and the frame relay network, and the second site is a site on the other of the ATM network and the frame relay network; and step (a) includes forming each inter-device message to be capable of being encapsulated in a single ATM cell and in a single frame relay frame.

89. The method of claim 85, wherein:

the sequence of data measurement messages includes first and third messages transmitted over the data transmission circuit from the first site to the second site in accordance with the inter-device message transmission structure, and second and fourth messages transmitted over the data transmission circuit from the second site to the first site in accordance with the inter-device message transmission structure; and step (a) includes forming the inter-device messages such that: when said message type field identifies the inter-device message as the third message in the sequence, said count field contains the count $OFF_A$; and when said message type field identifies the inter-device message as the fourth message in the sequence, the count field contains the count $OFF_B$.

90. The method of claim 85, wherein step (a) includes forming each of the inter-device messages to include:

a first timestamp field for transmitting timestamp data indicating a time at which a previous message in the sequence was received; and a second timestamp field for transmitting timestamp data indicating a time at which a previous message in the sequence was transmitted.

91. The method of claim 90, wherein:

the sequence of data measurement messages includes first and third messages transmitted over the data transmission circuit from the first site to the second site in accordance with the inter-device message transmission structure, and second and fourth messages transmitted over the data transmission circuit from the second site to the first site in accordance with the inter-device message transmission structure; and step (a) includes forming the inter-device messages such that: when said message type field identifies the inter-device message as the second message in the sequence, said first timestamp field indicates a receive time of the first message; when said message type field identifies the inter-device message as the third message in the sequence, said first timestamp field indicates a receive time of the second message, said second timestamp field indicates a transmit time of the first message, and said count field contains the count $OFF_A$; and when said message type field identifies the inter-device message as the fourth message in the sequence, said second timestamp field indicates a transmit time of the second message, and the count field contains the count $OFF_B$.

* * * * *